(12) United States Patent
Gilles et al.

(10) Patent No.: US 10,682,998 B2
(45) Date of Patent: Jun. 16, 2020

(54) HYDRAULIC ASSEMBLY FOR A VEHICLE BRAKE SYSTEM

(71) Applicant: Lucas Automotive GmbH, Koblenz (DE)

(72) Inventors: Leo Gilles, Koblenz (DE); Boris Koeth, Weitersburg (DE)

(73) Assignee: Lucas Automotive GmbH, Koblenz (DE)

( * ) Notice: Subject to any disclaimer, the term of this patent is extended or adjusted under 35 U.S.C. 154(b) by 17 days.

(21) Appl. No.: 15/727,781

(22) Filed: Oct. 9, 2017

(65) Prior Publication Data

US 2018/0281766 A1    Oct. 4, 2018

Related U.S. Application Data

(63) Continuation of application No. 14/935,494, filed on Nov. 9, 2015, now Pat. No. 9,783,176, which is a (Continued)

(30) Foreign Application Priority Data

May 10, 2010    (DE) .................. 10 2010 020 002

(51) Int. Cl.
*B60T 13/16* (2006.01)
*B60T 8/40* (2006.01)
(Continued)

(52) U.S. Cl.
CPC .............. *B60T 13/168* (2013.01); *B60T 8/17* (2013.01); *B60T 8/368* (2013.01); *B60T 8/4018* (2013.01); *B60T 8/4081* (2013.01); *B60T 13/686* (2013.01)

(58) Field of Classification Search
CPC . B60T 8/17; B60T 8/343; B60T 8/344; B60T 8/3675; B60T 8/368; B60T 8/4018;
(Continued)

(56) References Cited

U.S. PATENT DOCUMENTS

| 4,597,611 A | 7/1986 | Nishimura et al. |
| 4,850,650 A | 7/1989 | Eckert et al. |

(Continued)

FOREIGN PATENT DOCUMENTS

| DE | 3502018 A1 | 7/1986 |
| DE | 4029793 A1 | 3/1992 |

(Continued)

OTHER PUBLICATIONS

Extended European Search Report, Application No. EP 15002159.0, dated Sep. 30, 2015.

(Continued)

*Primary Examiner* — Thomas J Williams
(74) *Attorney, Agent, or Firm* — MacMillan, Sobanski & Todd, LLC

(57) ABSTRACT

A hydraulic assembly for a vehicle brake system comprising at least two brake circuits and wheel brakes associated with the brake circuits. The hydraulic assembly comprises a pressure generator for generating a central hydraulic pressure for the brake circuits independently of the driver at least in the case of service braking initiated by the driver. Furthermore, at least one pressure adjusting device is provided for adjusting for each individual brake circuit the central hydraulic pressure that is generated by the pressure generator independently of the driver.

2 Claims, 17 Drawing Sheets

Related U.S. Application Data continuation of application No. 13/696,688, filed as application No. PCT/EP2011/002320 on May 10, 2011, now Pat. No. 9,227,609.

(51) Int. Cl.
*B60T 8/17* (2006.01)
*B60T 8/36* (2006.01)
*B60T 13/68* (2006.01)

(58) Field of Classification Search
CPC .... B60T 8/4081; B60T 8/4086; B60T 13/168; B60T 13/686
See application file for complete search history.

(56) References Cited

U.S. PATENT DOCUMENTS

| | | | |
|---|---|---|---|
| 5,607,207 A * | 3/1997 | Nagashima | B60T 8/368 188/356 |
| 5,609,399 A | 3/1997 | Feigel et al. | |
| 5,927,825 A | 3/1999 | Schenk et al. | |
| 5,941,608 A | 8/1999 | Campau et al. | |
| 5,988,767 A | 11/1999 | Inoue et al. | |
| 6,007,161 A | 12/1999 | Worsdorfer | |
| 6,042,200 A | 3/2000 | Hosoya et al. | |
| 6,082,834 A | 7/2000 | Kolbe et al. | |
| 6,508,521 B2 | 1/2003 | Gegalski et al. | |
| 6,942,304 B1 | 9/2005 | Bayer et al. | |
| 6,969,128 B2 | 11/2005 | Sekihara | |
| 7,150,508 B2 | 12/2006 | Ganzel | |
| 7,311,365 B2 | 12/2007 | Nohira | |
| 7,325,884 B2 | 2/2008 | Ganzel | |
| 7,857,397 B2 | 12/2010 | Nanri et al. | |
| 8,167,381 B2 | 5/2012 | Nakamura et al. | |
| 8,424,976 B2 | 4/2013 | Dinkel et al. | |
| 8,540,324 B2 | 9/2013 | Leiber et al. | |
| 9,227,609 B2 | 1/2016 | Gilles et al. | |
| 9,783,176 B2 * | 10/2017 | Gilles | B60T 8/4018 |
| 2002/0005074 A1 | 1/2002 | Myers et al. | |
| 2003/0222497 A1 | 12/2003 | Fey et al. | |
| 2007/0024111 A1 | 2/2007 | Ganzel | |
| 2007/0108836 A1 | 5/2007 | Feigel | |
| 2007/0252430 A1 | 11/2007 | Nishikawa et al. | |
| 2009/0115247 A1 | 5/2009 | Leiber et al. | |
| 2009/0206653 A1 | 8/2009 | Nakamura et al. | |
| 2010/0078990 A1 | 4/2010 | Nand et al. | |
| 2010/0219678 A1 | 9/2010 | Koeth | |
| 2011/0115282 A1 | 5/2011 | Dinkel et al. | |
| 2012/0169112 A1 | 7/2012 | Jungbecker et al. | |
| 2016/0185329 A1 | 6/2016 | Lee et al. | |

FOREIGN PATENT DOCUMENTS

| | | |
|---|---|---|
| DE | 4232132 A1 | 3/1994 |
| DE | 19961849 A1 | 3/2001 |
| DE | 102004046448 A1 | 6/2005 |
| DE | 102006014836 A1 | 10/2007 |
| DE | 102007047208 A1 | 4/2009 |
| DE | 102009033499 A1 | 1/2010 |
| EP | 0265623 A2 | 8/1987 |
| EP | 0280740 A1 | 3/1988 |
| JP | H110250568 A | 9/1998 |
| WO | 9713672 A1 | 4/1997 |
| WO | 9806612 A1 | 2/1998 |
| WO | 2004067344 A1 | 8/2004 |
| WO | 2005014352 A1 | 2/2005 |
| WO | 2006111393 A1 | 10/2006 |
| WO | 2006136477 A1 | 12/2006 |
| WO | 2011029812 A1 | 3/2011 |

OTHER PUBLICATIONS

PCT International Search Report and the Written Opinion, Application No. PCT/EP2011/002320 filed May 10, 2011, dated Nov. 11, 2011.

* cited by examiner

HYDRAULIC ASSEMBLY FOR A VEHICLE BRAKE SYSTEM

CROSS-REFERENCE TO RELATED APPLICATIONS

This application is a continuation of U.S. patent application Ser. No. 14/935,494, filed Nov. 9, 2015, now U.S. Pat. No. 9,783,176, issued Oct. 10, 2017, the disclosures of which are incorporated herein by reference in entirety, which is a continuation of U.S. patent application Ser. No. 13/696,688, filed Feb. 11, 2013, now U.S. Pat. No. 9,227,609, issued Jan. 5, 2016, the disclosures of which are incorporated herein by reference in entirety, which is the national stage of International Application No. PCT/EP2011/002320, filed May 10, 2011, the disclosures of which are incorporated herein by reference in entirety, and which claimed priority to German Patent Application No. DE 10 2010 020 002.6, filed May 10, 2010, the disclosures of which are incorporated herein by reference in entirety.

BACKGROUND OF THE INVENTION

The present disclosure is directed towards a hydraulic assembly for a multiple-circuit vehicle brake system. The hydraulic assembly comprises a pressure generator for generating a hydraulic pressure in the brake circuits independently of the driver.

Conventional vehicle brake systems may be actuated either by a driver or independently of a driver. A braking operation initiated by the driver is referred to also as a service braking operation. In the course of a service braking operation initiated by the driver or independently thereof a driving safety system may cause a braking operation independently of the driver. This is referred to as a system braking operation that may be chronologically superimposed on a service braking operation or occur at a separate time to a service braking operation. Known driving safety systems comprise for example an anti-lock braking system (ABS), electronic stability control (ESC and/or ESP) and similar systems.

In conventional vehicle brake systems, in the case of a service braking operation, the hydraulic pressure in the brake circuits is generated by the driver himself. For this purpose the brake circuits are coupled hydraulically to a master cylinder, which is actuated by the driver in a known manner by means of a brake pedal.

In modern vehicle brake systems the generation of hydraulic pressure during a service braking operation may be effected also by the means of a pressure generator that is actuable independently of the driver. As a rule such a pressure generator is a hydraulic pump, which is for example part of an electrohydraulic vehicle brake system or a regenerative vehicle brake system ("hybrid brake system").

In an electrohydraulic brake system, according to the "brake-by-wire" principle the master cylinder during the service braking operation is fluidically uncoupled from the brake circuits. The generation of hydraulic pressure is effected here by means of the hydraulic pump, which is triggered in dependence upon an actuating state of the brake pedal. In a regenerative vehicle brake system, during a service braking operation the master cylinder is likewise hydraulically uncoupled from the brake circuits. Decelerating of the vehicle is effected in this case by means of a generator that charges a vehicle battery. If the driver requires a greater vehicle deceleration than the generator can deliver, the hydraulic pump generates a supplementary hydraulic pressure in the brake circuits. This process is referred to also as "blending".

From DE 10 2007 047 208 A1 and corresponding U.S. Patent Application Publication No. 2010/0219678 A1, both of which are incorporated by reference herein in entirety, a dual-circuit electrohydraulic brake system is known. The brake system comprises two electric motor-driven pressure generators, which are realized in the form of a dual-circuit fluid feed pump. By means of the dual-circuit fluid feed pump an individual hydraulic pressure may be generated in each of the two brake circuits.

BRIEF SUMMARY OF THE INVENTION

A feature of the present disclosure is a vehicle brake system, which during a service braking operation initiated by the driver efficiently allows a hydraulic pressure to be generated in the brake circuits independently of the driver. A hydraulic assembly for such a vehicle brake system is also to be indicated.

In the present disclosure a hydraulic assembly is provided for a vehicle brake system comprising at least two brake circuits and wheel brakes associated with the brake circuits. The vehicle brake system comprises a pressure generator for generating a central hydraulic pressure for the brake circuits independently of the driver at least in the case of a service braking operation. The hydraulic assembly further comprises at least one pressure adjusting device for adjusting for each individual brake circuit the central hydraulic pressure generated by the pressure generator independently of the driver.

The pressure generator may be devised to provide the central hydraulic pressure also in the case of a system braking operation. The system braking operation may be chronologically superimposed on a service braking operation or occur at a separate time from a service braking operation. Here, by a system braking operation is generally meant a braking intervention by a driving safety system that occurs independently of the driver. The automatic braking intervention may lead for example to a hydraulic pressure build-up or to a prevailing hydraulic pressure being raised, lowered or maintained.

The pressure generator centrally generates for all of the brake circuits a common hydraulic pressure that may then, if necessary, be adjusted for each individual brake circuit by means of the pressure adjuster. It is thereby possible, despite central hydraulic pressure generation, to adjust a pressure difference between the brake circuits. According to a variant the hydraulic pressure adjustment is effected across a continuous pressure range. According to an alternative variant the adjustment relates to a discrete or even binary ("on/off") hydraulic pressure supply of an individual brake circuit.

The pressure adjuster may comprise one or more valve devices. Each valve device may in turn comprise one or more valve groups, and each valve group may contain one or more valves. Thus, it would for example be conceivable for each valve device of the pressure adjuster to comprise one valve group comprising at least one valve per brake circuit.

Alternatively or in addition to the at least one valve device the pressure adjuster may also comprise control electronics such as for example a control unit for the pressure generator. There may also be associated with each valve device control electronics for actuating the valve device. In a realization of this concept the pressure adjuster comprises a first valve device, which is electrically actuable in order to adjust (for example reset) a hydraulic pressure corresponding to the actuating state. The first valve device may be electrically actuable by means of pulse width modulation. In this case the actuating state of the first valve device is adjustable by means of the pulse width.

An implementation of the hydraulic assembly provides that the first valve device comprises at least one adjusting valve, which is adjustable (at least) between an open valve position and a closed valve position. Such an adjusting valve may be adjustable digitally, discretely or continuously and be provided for each brake circuit.

The first valve device may further comprise a first non-return valve, which is connected in parallel to the and/or each adjusting valve. In an exemplified implementation the first non-return valve is connected in parallel to the adjusting valve in a way that in the closed state of the adjusting valve enables an overflow of the adjusting valve in the direction of the wheel brakes. In this exemplified implementation, therefore, the non-return valve even in the closed state of the adjusting valve allows a further hydraulic pressure build-up in at least one of the brake circuits by means of the pressure generator.

The pressure generator may comprise an inlet port for hydraulic fluid as well as an outlet port for hydraulic fluid. These ports may be provided separately from one another. Alternatively the ports may be realized by means of a single common port, via which both the intake and the discharge of the hydraulic fluid is effected. In the latter case the ports in the form of the common port are fluidically coupled to one another. In the former case a fluidic coupling of the two ports may be effected within the pressure generator. Alternatively or in addition thereto, the inlet port and the outlet port may be fluidically coupled to one another also outside of the pressure generator.

In an intake line, which opens out into the inlet port, a second valve device may be provided. The second valve device may comprise for example a second non-return valve, which opens in the event of an intake (for example in the event of an intake stroke) of the pressure generator and closes in the event of a discharge (for example in the event of a discharge stroke) of the pressure generator.

The inlet port (and/or an associated intake line) is or may be coupled to an unpressurized hydraulic fluid reservoir. From this reservoir the pressure generator may take in unpressurized hydraulic fluid before then feeding it into one or more of the brake circuits.

The pressure generator may comprise a hydraulic chamber for receiving hydraulic fluid so that the brake circuits may be supplied with hydraulic fluid from the hydraulic chamber. Both the inlet port and the outlet port (and/or a corresponding combined port) may open out into the hydraulic chamber.

The pressure generator may be a conventional multi-piston pump that generates a desired hydraulic pressure by means of typically a plurality of piston strokes. According to an alternative development the pressure generator comprises a plunger piston that is movable within the hydraulic chamber. In an advantageous manner a single hydraulic chamber with a single plunger piston is provided for all of the brake circuits. In the case of the pressure generator equipped with a plunger piston, given a hydraulic chamber of sufficiently large dimensions the build-up of the desired hydraulic pressure may be effected by means of a single discharge stroke movement.

The pressure generator may comprise an electric motor for actuation of the piston pump and/or the plunger piston. If necessary, a gear (typically a reduction gear) may be provided between the electric motor and the pressure generator. The gear may be a belt drive, a toothed gear or a combination of these two gear types.

The electric motor may be disposed coaxially or axially offset relative to the plunger piston. According to a realization the electric motor is provided axially offset but paraxially relative to the plunger piston.

The pressure adjuster may further comprise a first control unit for the electric motor. The first control unit may be devised to supply the electric motor with trigger signals in dependence upon the hydraulic pressure to be generated. For a controlled triggering of the electric motor a pressure sensor may further be provided (for example in the hydraulic chamber or in the brake circuits), the output signal of which is evaluated by the first control unit for the purpose of an actual-value/setpoint-value comparison.

The hydraulic assembly may comprise a changeover device. The changeover device is provided for supplying the wheel brakes selectively with the hydraulic pressure generated independently of the driver or with a hydraulic pressure generated by the driver. The changeover device may be electrically actuable, wherein in a non-actuated state it couples the wheel brakes to a driver-actuable master cylinder and in an actuated state it couples the wheel brakes to the pressure generator. The changeover device may therefore be configured in accordance with the "push-through" principle in order for example in the event of failure of the pressure generator at any rate still to enable a driver-induced hydraulic pressure generation.

With regard to the changeover device various realizations are possible. Thus, the changeover device may for example comprise a 3/2-way valve or two 2/2-way valves. Other valve configurations would of course also be conceivable.

The hydraulic assembly may possess a modular structure of two or more independently manipulable subassemblies. A plurality of technically different versions of individual subassemblies may exist. In accordance with the modular design principle the hydraulic assembly may therefore be configured differently for different types of vehicle.

Thus, for example the changeover device, the pressure adjuster and the pressure generator may form a first independently manipulable subassembly (wherein the changeover device need not necessarily be part of the first subassembly). With regard to the first subassembly a plurality of different types may exist, which differ for example with regard to the hydraulic fluid feed capacity of the respective pressure generator and/or with regard to the configuration of the pressure adjuster. The master cylinder also may be part of the first subassembly or part of a further subassembly.

Between the pressure adjuster and the wheel brakes a third valve device may be provided in order to enable braking interventions to be carried out at the wheel brakes independently of the driver. The third valve device may be for example part of a driving safety system (for example an ABS and/or ESC system).

According to a first variant the third valve device is part of the first subassembly. According to another variant the third valve device is part of an independently manipulable second subassembly. With regard to the second subassembly too, various types may exist, which differ for example with regard to the respective valve configuration. Thus, according to a first configuration the third valve device may comprise exclusively non-controllable shut-off valves, which are switchable only in a binary ("on/off") manner. According to an alternative configuration the third valve device may comprise controllable valves (in addition or as an alternative to non-controllable shut-off valves).

In another development of the third valve device disposed between the pressure adjuster and the wheel brakes, the third valve device may be used to adjust a brake pressure for each individual wheel or wheel group (for example for a group of two wheels). The brake pressure adjustment for each individual wheel or wheel group may be effected in multiplex mode (for example by individual- or group opening and closing of valves of the third valve device).

According to an implementation of the third valve device, it comprises precisely one valve per wheel brake. The valve may be a 2/2-way valve. There may further be provided for the third valve device control electronics for triggering the individual valves in multiplex mode.

Independently of the concrete form of the third valve device the pressure generator may be coupled or capable of coupling to at least one hydraulic fluid return line that is associated with the third valve device. The pressure generator may moreover have a fluid-receiving functionality for hydraulic fluid flowing back through the hydraulic fluid return line (from the wheel brakes). The second valve arrangement may be disposed entirely or completely in the return line. In particular, a non-return valve of the second valve arrangement may be mounted in the return line. In this way it is possible for example to prevent hydraulic fluid that is delivered by the pressure generator from passing through the return line to the wheel brakes.

The hydraulic fluid return line may be separate from (and also not connectable to) an unpressurized hydraulic fluid reservoir. The reservoir may otherwise be used for example to supply a master cylinder of the vehicle brake system with hydraulic fluid.

At least one pressure accumulator may moreover be coupled or capable of coupling to the hydraulic fluid return line. The at least one pressure accumulator may be configured to store hydraulic fluid that flows back through the hydraulic fluid return line. The at least one pressure accumulator may be configured as a low pressure accumulator (LPA).

According to a variant the at least one pressure accumulator is provided in the hydraulic fluid return line between the pressure generator and the third valve device. Thus, the at least one pressure accumulator may be introduced into the hydraulic fluid return line, say, between the second valve device and the third valve device. In the case of a multiple-circuit vehicle brake system a separate pressure accumulator per brake circuit may be provided.

For carrying out braking interventions at the wheel brakes independently of the driver a second control unit may be provided. The second control unit may be part of the driving safety system and be designed to trigger the pressure generator in order in a hazardous situation to build up a hydraulic pressure independently of the driver. The second control unit may moreover be designed to influence the prevailing hydraulic pressure by suitable triggering of the third valve device in the hazardous situation.

According to one implementation the first control unit is part of the first subassembly, while the second control unit is part of the second subassembly. It would however also be conceivable to implement the functionalities of the first control unit and the second control unit in a common control unit. The common control unit may then be (like the third valve device) part of the first subassembly.

For a regenerative vehicle brake system a third control unit may further be provided for the regenerative braking mode. The third control unit is designed to trigger the pressure generator in the regenerative braking mode in order to build up a hydraulic brake pressure independently of the driver. The build-up of the hydraulic brake pressure at the wheel brakes may be effected during a generator mode ("blending").

In a regenerative vehicle brake system the hydraulic assembly may further comprise a pedal reaction simulation unit, which in the regenerative braking mode is actuable by means of a hydraulic pressure generated by the driver (for example in the master cylinder). The pedal reaction simulation unit may be part of the first subassembly. Alternatively the pedal reaction simulation unit, optionally together with the master cylinder, may form an independently manipulable third subassembly. Once more, various types of third subassembly may be provided, which differ for example with regard to the volume dimension of the master cylinder and/or of the pedal reaction simulation unit.

The presently described hydraulic assembly may be part of an electrohydraulic or a regenerative vehicle brake system. The corresponding brake system may further comprise suitable devices for the "brake-by-wire" mode. Such devices may include a brake pedal with associated pedal sensor, as well as control electronics that trigger the pressure generator in dependence upon an output signal of the pedal sensor. The respective brake system may moreover comprise the brake circuits with associated brake lines and wheel brakes.

In the case of a regenerative vehicle brake system, in addition to the pedal reaction simulation unit a generator may further be provided. The generator is used to charge a vehicle battery in the generator mode in the course of a service braking operation.

Other advantages of this invention will become apparent to those skilled in the art from the following detailed description of the preferred embodiments, when read in light of the accompanying drawings.

DETAILED DESCRIPTION OF THE INVENTION

Figure 1:
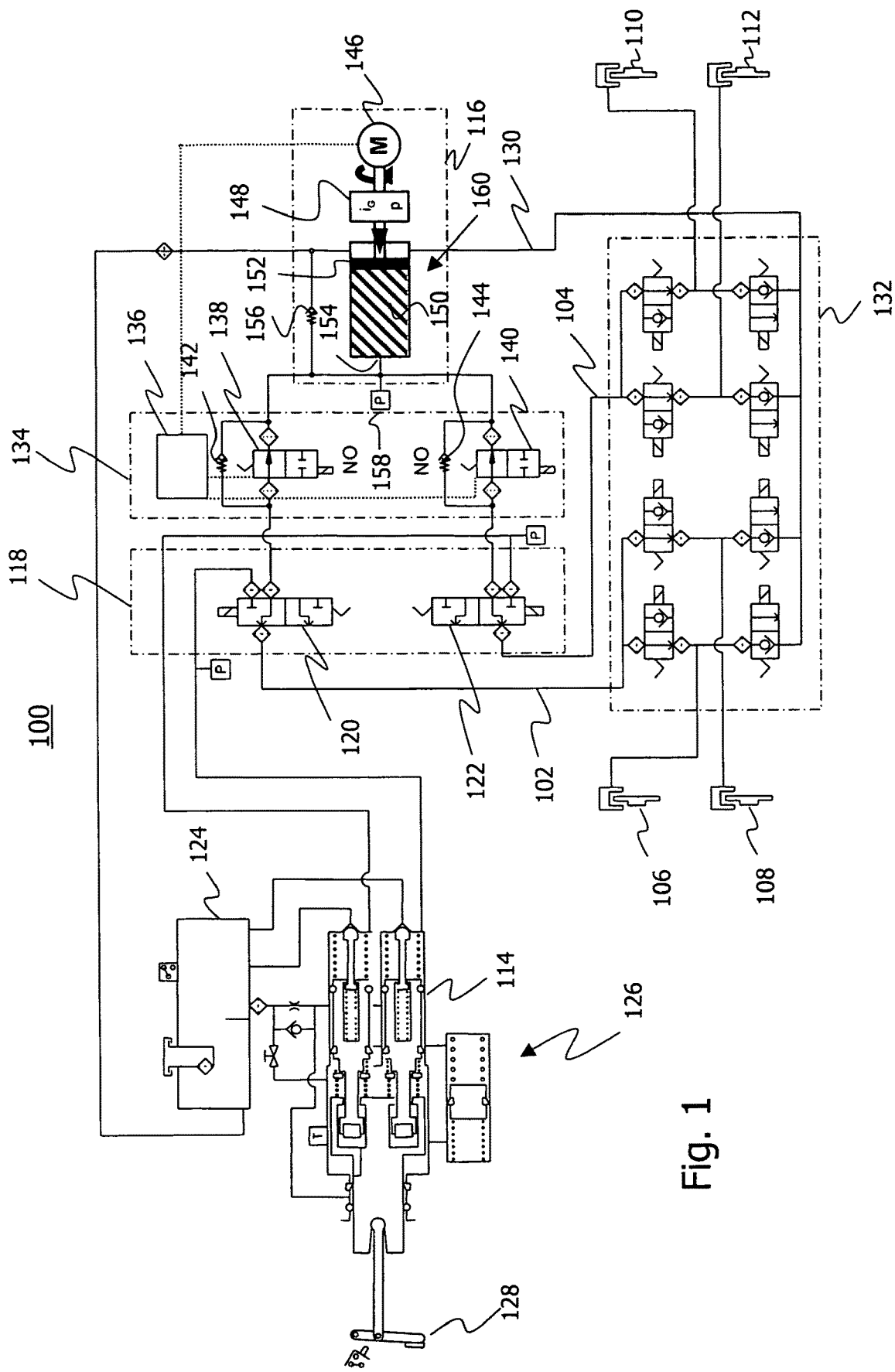
FIG. 1 is a first embodiment of a vehicle brake system.

There now follows a description with reference to the drawings of various embodiments of a vehicle brake system and a hydraulic assembly provided therefor. In the drawings identical elements are provided with the same reference characters.

Although the embodiments are described in connection with an exemplified motor vehicle brake system and an exemplified pressure generator, it should be pointed out that the invention is not restricted to the realizations described here. Thus, the pressure generator may not only operate in accordance with the plunger principle presented here but may also be configured in the form of a cyclically operating multi-piston pump, with which a pressure accumulator may selectively be associated. The presently described concept may moreover be implemented also in brake systems with more than two brake circuits, with a different brake circuit split (for example a diagonal split), etc.

FIG. 1 shows a first embodiment of a vehicle brake system 100. The vehicle brake system 100 is an electrohydraulic vehicle brake system or a regenerative vehicle brake system (or a combination thereof).

The vehicle brake system 100 according to FIG. 1 comprises a plurality of components, which, if need be, may be configured as one or more independently manipulable hydraulic assemblies. Different hydraulic assemblies may be installed at mutually remote areas of a motor vehicle.

The individual hydraulic components and their functions are first described in detail below. Possible configurations of the hydraulic components will then be presented in connection with independently manipulable subassemblies.

As represented in FIG. 1, the vehicle brake system 100 is a dual-circuit brake system. A first brake circuit 102 is configured to supply two rear wheel brakes 106, 108 with hydraulic fluid. A second brake circuit 104 performs the same task with regard to two front wheel brakes 110, 112.

Hydraulic fluid may be supplied selectively to the two brake circuits 102, 104 by a driver-actuable master cylinder 114 or by an electric motor-operable pressure generator 116. By means of the pressure generator 116 it is therefore possible to generate a hydraulic pressure in the two brake circuits 102, 104 independently of the driver.

A changeover device 118 is provided functionally between the wheel brakes 106, 108, 110, 112 on the one hand and the master cylinder 114 and the pressure generator 116 on the other hand. The changeover device 118 in the embodiment according to FIG. 1 comprises one electrically actuable 3/2-way valve 120, 122 per brake circuit 102, 104.

In the electrically non-actuated state the valves 120, 122 couple the wheel brakes 106, 108, 110, 112 in accordance with the "push-through" principle to the master cylinder. Thus, in the event of failure of the vehicle electrical system or the vehicle electronic system a deceleration of the vehicle may be guaranteed by means of a hydraulic pressure generated in the master cylinder 114 by the driver. In the electrically actuated state according to FIG. 1 the two valves 120, 122 couple the wheel brakes 106, 108, 110, 112 to the pressure generator 116. In this case, by means of the pressure generator 116 a build-up of hydraulic pressure in the two brake circuits 102, 104 may be effected both in the course of a service braking operation initiated by the driver and in the course of a system braking operation. Possible trigger scenarios for the pressure generator 116 in the case of an electrohydraulic and/or regenerative service braking operation are described in detail later.

The master cylinder 114 is supplied with hydraulic fluid by means of an unpressurized reservoir 124. In the electrically actuated state of the 3/2-way valves 120, 122—i.e. when the master cylinder 114 is uncoupled from the wheel brakes 106, 108, 110, 112—the hydraulic fluid removed from the unpressurized reservoir 124 is fed by the master cylinder 114 into a pressurized reservoir 126. The pressurized reservoir 126 is a pedal reaction simulator, which because of the uncoupling of the master cylinder 114 from the wheel brakes 106, 108, 110, 112 provides the driver with the customary reaction behaviour of a brake pedal 128 actuating the master cylinder 114. The master cylinder 114 and the pedal reaction simulation unit 126 may for example have the structure known from DE 199 50 862 A1. The pedal reaction simulation unit 126 is based here on the mechanical "cut-off" principle, according to which as a result of the displacement of a piston of the master cylinder 114 the pedal reaction simulation function is cut in and cut out.

As is evident from FIG. 1, a fluid line 130 (combined return/intake line) opens out into the unpressurized hydraulic fluid reservoir 124. Through the line 130 hydraulic fluid may flow from the wheel brakes 106, 108, 110, 112 back into the reservoir 124. The pressure generator 116 may moreover take in hydraulic fluid through this line 130. Following the intake operation the hydraulic fluid that is taken in is fed into the brake circuits 102, 104 in order in the course of a service braking operation or system braking operation to build up a hydraulic pressure in the wheel brakes 106, 108, 110, 112.

Between the changeover device 118 and the wheel brakes 106, 108, 110, 112 a valve device 132 is provided for carrying out braking interventions at the wheel brakes 106, 108, 110, 112 independently of the driver. The valve device 132 comprises two (preferably non-controllable) shut-off valves per wheel brake, which are designed as 2/2-way valves. By means of these valves it is possible to carry out in a known manner pressure build-up, pressure-maintaining and pressure reduction phases in the course of system braking operations, i.e. safety-related driver-independent braking interventions. Such braking interventions may comprise for example ABS control interventions or ESC control interventions. As such control interventions are known as such, they are not described in greater detail here.

The brake system 100 according to FIG. 1 further comprises a pressure adjuster 134 for adjusting for each individual brake circuit the hydraulic pressure generated centrally by the pressure generator 116. The pressure adjuster 134 in the embodiment according to FIG. 1 comprises control electronics 136 as well as a valve device comprising two (preferably non-controllable) shut-off valves 138, 140. As represented in FIG. 1, the valves 138, 140 are electrically actuable valves, which are open ("normally open" or "NO") in the electrically non-actuated state. The control electronics 136 are provided primarily for the pressure generator 116 and moreover enable an optional triggering of the valves 138, 140.

As represented in FIG. 1, a non-return valve 142, 144 loaded with a spring force is connected in parallel to each of the two valves 138, 140. The parallel connection of the non-return valves 142, 144 enables in the closed valve position of the valves 138, 140 an overflow of the closed valves 138, 140 in the direction of the wheel brakes 106, 108, 110, 112. It is therefore possible even in the closed valve position of these valves 138, 140 to build up and/or increase a pressure at the wheel brakes 106, 108, 110, 112 by means of the pressure generator 116 if the pressure generated by the pressure generator 116 exceeds a preset threshold value. This threshold value is defined by the spring force, with which the non-return valves 142, 144 are loaded.

A closing of the two valves 138, 140 is necessary for example if in the course of a braking intervention carried out independently of the driver (system braking operation) a follow-up intake of hydraulic fluid by the pressure generator 116 from the unpressurized reservoir 124 becomes necessary. The braking intervention may be an ABS- or ESC control process.

There now follows a description of the structure and mode of operation of the pressure generator 116. The task of the pressure generator 116 is to generate a central (i.e. single and/or uniform) hydraulic pressure for both brake circuits 102, 104. The adjustment of the hydraulic pressure for each individual brake circuit is then effected, as described above, by means of the pressure adjuster 134 connected downstream of the pressure generator 116.

The pressure generator 116 comprises an electric motor 146 that is triggerable by means of the control electronics 136, a gear 148 rear-mounted at the output end of the electric motor 146, as well as a cylinder/piston system 160 rear-mounted at the output end of the gear 148. The cylinder/piston system 160 comprises a single hydraulic chamber 150, within which a plunger piston 152 is movably guided. The position of the plunger piston 152 within the hydraulic chamber 150—and hence the hydraulic pressure inside the hydraulic chamber 150—is adjustable by means of the electric motor 146.

As shown in FIG. 1, the hydraulic chamber 150 has a port 154, through which hydraulic fluid may be taken into the chamber 150 and discharged from the chamber 150. The intake and/or discharge of hydraulic fluid is effected by means of a reciprocating movement of the plunger piston 152.

The port 154 is fluidically coupled to the input side of each of the two valves 138, 140 of the pressure adjuster 134. The port 154 is moreover fluidically coupled to the return line 130 by a non-return valve 156, which is loaded with a spring force. The non-return valve 156 is disposed in such a way that it opens in the event of an intake stroke of the plunger piston and closes in the event of a discharge stroke. In this way hydraulic fluid may be fed from the unpressurized reservoir 124 into the hydraulic chamber 150 without hydraulic fluid, which has been discharged from the hydraulic chamber 150, being able to flow back directly into the unpressurized reservoir 124.

A pressure sensor 158 is likewise fluidically coupled to the port 154. The pressure sensor 158 supplies an output signal to the control electronics 136. On the basis of this output signal the control electronics 136 carry out an actual-value/setpoint value comparison and on the basis of this comparison generates trigger signals for the electric motor 136. In this way a closed control loop for the hydraulic pressure generation in the course of a service braking operation or system braking operation is realized.

The realization of the pressure generator 116 that is represented in the embodiment according to FIG. 1 has certain advantages over the use of other pressure generators such as multi-piston pumps. It is for example possible to dispense with the pressure accumulator for hydraulic fluid that is typically needed with conventional multi-piston pumps. The pressure pulsations typical of multi-piston pumps are moreover eliminated since because of the dimensioning of the hydraulic chamber 150 a single reciprocating movement of the plunger piston 152 is generally sufficient to reduce a desired hydraulic pressure. The plunger approach proposed here is moreover particularly suitable for the rapid build-up (in the order of magnitude of 1000 bar/s) of a central hydraulic pressure with subsequent adjustment of the hydraulic pressure for each individual brake circuit.

There now follows a detailed description of the mode of operation of the vehicle brake system 100 according to FIG. 1 and the adjustment of the hydraulic pressure centrally generated by the pressure generator 116 for each individual brake circuit by means of the two valves 136, 140 of the pressure adjuster 134.

In the event of an electrohydraulic service braking operation the control electronics 136 are designed to evaluate an output signal of a displacement- or force sensor (not shown in FIG. 1) that is associated with the brake pedal 128. The control electronics 136 then generate in dependence upon this output signal trigger signals for the pressure generator 116 so that the pressure generator 116 generates a hydraulic pressure in the brake circuits 102, 104. The hydraulic pressure generated by the pressure generator 116 in this case corresponds to the vehicle deceleration that is desired by the driver and communicated via the brake pedal 128.

In the event of a service braking operation in the regenerative mode, a triggering of the pressure generator 116 by means of the control electronics 136 is effected only if the deceleration request of the driver exceeds the vehicle deceleration achievable in the generator mode (for example in the event of a sudden re-pressing of the brake pedal 128 during an already previously initiated service braking operation). In this situation the control electronics 136 generate trigger signals for the pressure generator 116, which during the generator mode are geared to the supplementary generation of a hydraulic pressure at at least two of the wheel brakes 106, 108, 110, 112 (front axle and/or rear axle). A first deceleration component therefore results from the generator mode, while a second deceleration component goes back to the actuation of at least two of the wheel brakes 106, 108, 110, 112. The control electronics 136 ensure that both deceleration components together correspond to the deceleration value for the service braking operation that is requested by the driver at the brake pedal 128.

As an alternative to the two scenarios described above, a triggering of the pressure generator 116 by means of the control electronics 136 may be effected also in the situation of a system braking operation (and hence independently of an actuation of the brake pedal 128). In the embodiment according to FIG. 1 the hydraulic pressure generated centrally by the pressure generator 116 may be adjusted for each individual brake circuit by means of the valves 138, 140 of the pressure adjuster 134. This hydraulic pressure adjustment for each individual brake circuit is now described in detail.

To build up a hydraulic pressure in the brake circuits 102, 104 and hence at the wheel brakes 106, 108, 110, 112, a hydraulic pressure provided centrally by the pressure generator 116 is built up to an equal amount in both brake circuits 102, 104 independently of the position of the shut-off valves 138, 140—because of the non-return valves 142, 144 which are connected in parallel thereto and open as soon as there is a slight pressure build-up. To maintain the pressure the two valves 138, 140 are each closed so that the hydraulic pressures built up in the brake circuits 102, 104 cannot escape. However, an increase of these hydraulic pressures via the non-return valves 142, 144 (by an equal amount for both brake circuits 102, 104) is possible at any time. For this purpose the hydraulic pressure provided centrally by the pressure generator 116 need merely be further increased.

To reduce the pressure the hydraulic pressure provided centrally by the pressure generator 116 has to be reduced again. In this case the hydraulic pressures built up in the brake circuits 102, 104 may be reduced for each individual brake circuit (and hence also adjusted for each individual brake circuit). If for example in the course of an intake stroke of the pressure generator 116 the valve 138 associated with the brake circuit 102 is opened, while the valve 140 associated with the brake circuit 104 remains closed, then only the hydraulic pressure in the brake circuit 102 is reduced, while the hydraulic pressure in the brake circuit 104 is maintained. As a result a hydraulic pressure difference between the two brake circuits 102, 104 arises.

During practical operation of the vehicle brake system 100, in the event of a braking intervention initiated by the driver and/or automatically the adjustment of the desired hydraulic pressures and/or hydraulic pressure characteristics is effected by means of a purposeful time sequence of pressure build-up, pressure-maintaining and pressure reduction phases. For this purpose the pressure generator 116 and the valves 138, 140 are triggered in a suitable manner by means of the control electronics 136 in order, if need be, to realize a hydraulic pressure adjustment for each individual brake circuit. In the embodiment according to FIG. 1 the adjustment of the hydraulic pressures for each individual brake circuit results primarily from the fact that in the course of pressure reduction phases a pressure difference between the brake circuits 102, 104 may be adjusted by individual opening of one of the valves 138, 140.

For an ABS control process, but also to support other driver-independent braking interventions (for example ESP control, brake assist or regenerative braking) the third valve device 132 is available. As already mentioned, the third valve device 132 in a known manner allows an adjustment of the hydraulic pressures for each individual wheel and hence of the brake pressures in the wheel brakes 106, 108, 110, 112. In order for example during an ABS control process to feed hydraulic fluid, which has been discharged into the unpressurized reservoir 124, back into the brake circuits 102, 104, the associated brake circuits 102, 104 by closing both valves 138, 140 are brought into a pressure-maintaining phase and the hydraulic pressure provided centrally by the pressure generator 116 is reduced to an extent that enables a follow-up flow of hydraulic fluid from the unpressurized reservoir 124 through the non-return valve 156 back into the hydraulic chamber 150 of the pressure generator 116. It is then possible by means of the pressure generator 116 further to increase the hydraulic pressure that is maintained because of the closed valves 138, 140 (by overflow of the closed valves 138, 140 via the non-return valves 142, 144).

Figure 2A:
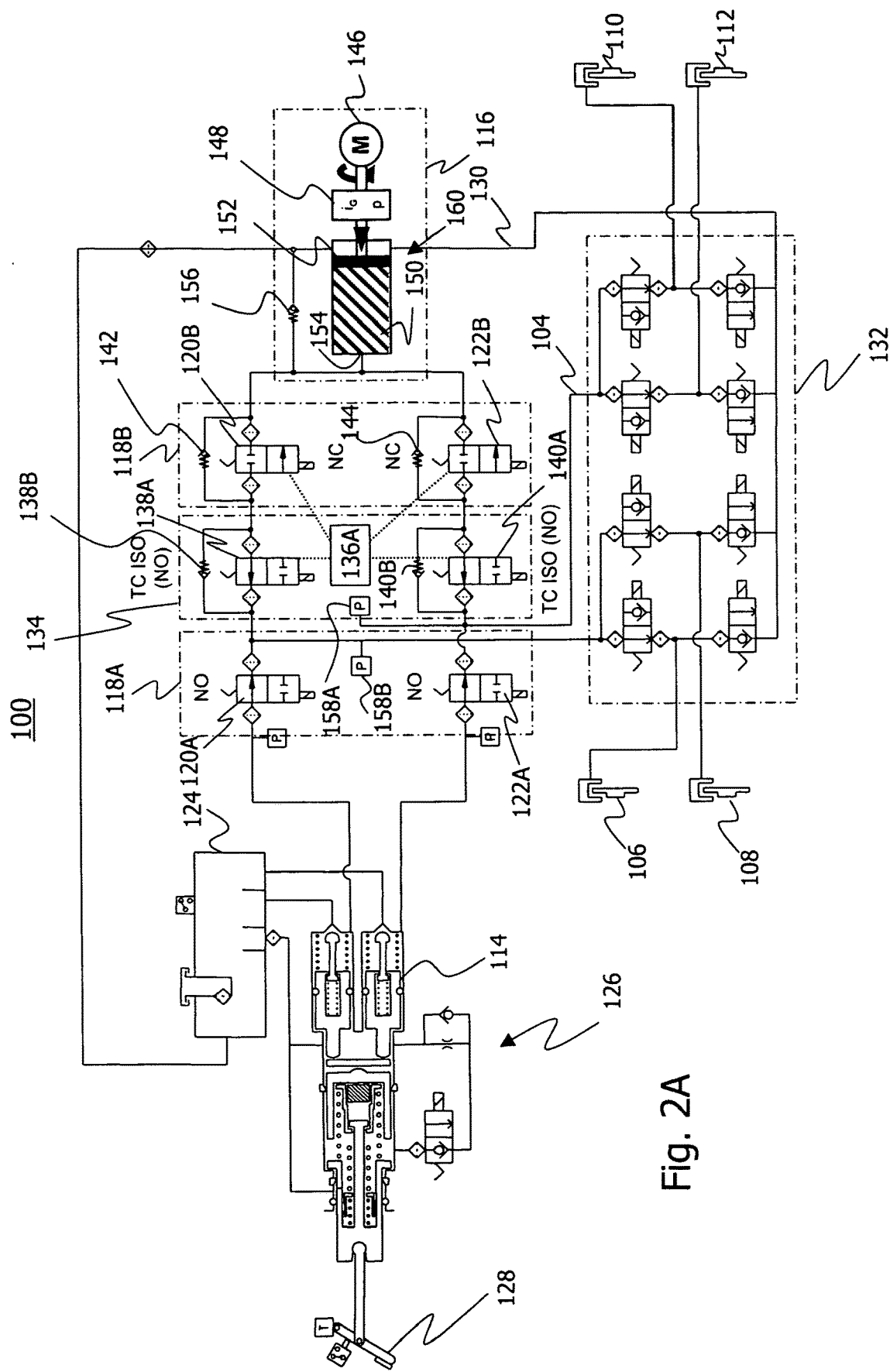
FIGS. 2A-2C are further embodiments of a vehicle brake system.

FIG. 2A shows a second embodiment of a vehicle brake system 100. The vehicle brake system according to FIG. 2A largely corresponds to the vehicle brake system of the first embodiment. For this reason only the structural features that differ are described in detail below. The differences relate primarily to the configuration of the pedal reaction simulation unit 126, the changeover device 118 and the pressure adjuster 134.

The pedal reaction simulation unit 126 has been modified to the extent that the simulation functionality is now cut in and cut out by means of an electromagnetically actuated 2/2-way valve. A possible realization of the thus configured pedal simulation unit 126 is known from DE 196 38 102 A1 and corresponding U.S. Pat. No. 6,135,572, the disclosures of which are both incorporated by reference herein in entirety. A further possible realization of the pedal reaction simulation unit 126 with external simulation spring is described in DE 10 2007 047 208 A1.

Both in the form of construction of the pedal reaction simulation unit 126 according to FIG. 1 and in the corresponding construction in FIG. 2A the master cylinder 114 is constructed with regard to the push-through mode in accordance with a "twin" arrangement. This means that a separate actuating piston is associated with each of the two brake circuits 102, 104, wherein the two actuating pistons are disposed parallel to one another. The relevant structural details of the master cylinder 114 may be gathered from DE 10 2005 037 792 A1 and corresponding U.S. Patent Application Publication No. 2010/0164276 A1, the disclosures of which are both incorporated by reference herein in entirety.

As FIG. 2A reveals, the modified changeover device now comprises, instead of the two 3/2-way valves 120, 122 provided in the first embodiment, four 2/2-way valves 120A, 122A, 120B, 122B that are apportioned to two functional units 118A, 118B of the changeover device. A first functional unit 118A comprises one electrically actuable shut-off valve 120A, 122A per brake circuit, which is open ("NO") in the electrically non-actuated state. The second functional unit 118B comprises one electrically actuable shut-off valve 120B, 122B per brake circuit, which is closed ("normally closed" or "NC") in the electrically actuated state. The second functional unit 118B further comprises one non-return valve 142, 144 per valve 120B, 122B, which is connected in parallel to the valve 120B, 122B. The mode of operation of the non-return valves 142, 144 with regard to an overflow has already been described in connection with the first embodiment.

FIG. 2A shows the basic setting of the valves 120A, 122A, 120B, 122B in the electrically non-actuated state. This state corresponds to the "push-through" mode, in which the wheel brakes 106, 108, 110, 112 are fluidically coupled to the master cylinder 114. To couple the pressure generator 116 to the wheel brakes 106, 108, 110, 112 the valves 120A, 122A, 120B, 122B are electrically actuated, with the result that the master cylinder 114 is simultaneously fluidically uncoupled from the wheel brakes 106, 108, 110, 112.

Between the two functional units 118A, 118B the modified pressure adjuster 134 is provided. The pressure adjuster 134 in the embodiment according to FIG. 2A comprises one controllable 2/2-way valve 138A, 140A per brake circuit 102, 104. The pressure adjuster 134 further comprises control electronics 136A for triggering the two control valves 138A, 140A by means of pulse width modulation. The actuating state of the two valves 138A, 140A is therefore individually adjustable continuously between a fully open valve position and a fully closed valve position by means of the pulse width of the trigger signals supplied to the respective valve 138A, 140A.

A non-return valve 138B, 140B is connected in parallel to each valve 138A, 140A. The combination of non-return valve 138B, 140B on the one hand and control valve 138A, 140A on the other hand enables a pressure-difference-based hydraulic pressure adjustment for each individual brake circuit, as is described in detail in DE 102 47 651 A1. The disclosure of DE 102 47 651 A1 with regard to the structure and the mode of operation of the control valves 138A, 140A is hereby incorporated by reference herein in entirety.

The decisive difference between the two embodiments of FIGS. 1 and 2A relates to the hydraulic pressure control. In the embodiment according to FIG. 1 a precise controlled triggering of the electric motor 146 is effected on the basis of an actual-value/setpoint-value comparison using a signal supplied by the pressure sensor 158. The pressure sensor 158 in this case is connected immediately downstream of the pressure generator 116. By means of the pressure adjuster 134 a hydraulic pressure adjustment for each individual brake circuit is then effected in the course of pressure reduction phases. In the second embodiment according to FIG. 2A, on the other hand, a different control concept is pursued. Here, for the hydraulic pressure control for each individual brake circuit trigger signals are supplied to the two control valves 138A, 140A for each individual brake circuit. The control electronics 136A generate these control signals on the basis of an actual-value/setpoint-value comparison taking into account output signals of pressure sensors 158A, 158B that are connected downstream of the valves 138A, 140A.

In contrast to the embodiment according to FIG. 1, the embodiment according to FIG. 2A enables a hydraulic pressure adjustment for each individual brake circuit also in the course of a pressure build-up phase. Thus, for example during the build-up of a central hydraulic pressure by means of the pressure generator 116 it is also possible independently of the position of the valves 138, 140 for the valve 120B associated with the brake circuit 102 to be opened and the valve 122B associated with the brake circuit 104 to be closed. In such a switching state of the valves 120B, 122B, therefore, only the hydraulic pressure in the brake circuit 102 is increased, while the hydraulic pressure in the brake circuit 104 is maintained. The valves 120B, 122B may accordingly be functionally associated with the pressure adjuster 134 and be triggered by the control electronics 136A.

Figure 2B:
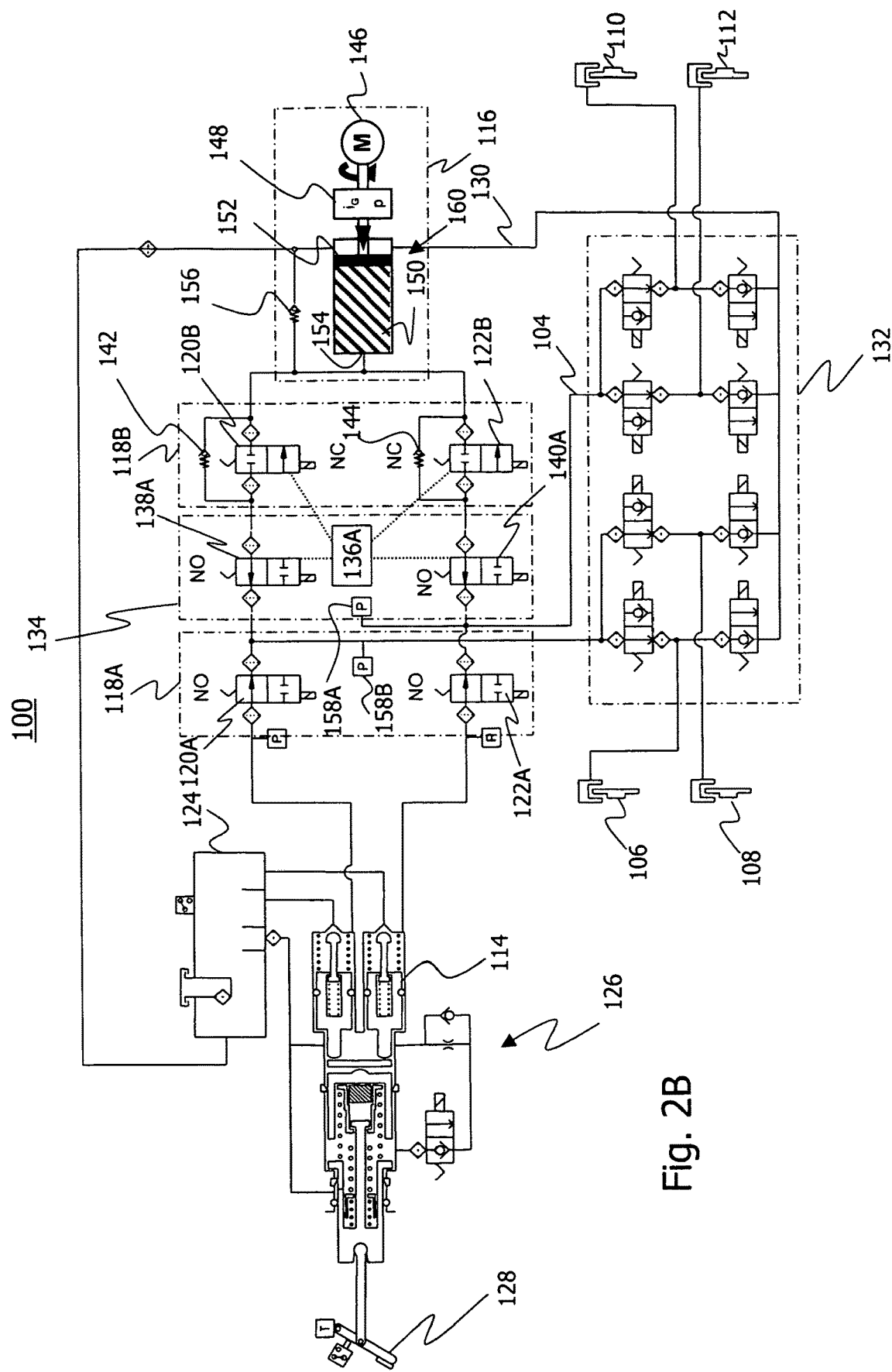

FIG. 2B shows a third embodiment of a vehicle brake system 100. The vehicle brake system 100 according to FIG. 2B largely corresponds to the vehicle brake system of the second embodiment. The crucial difference from the vehicle brake system of the second embodiment is that the valves 138A, 140A are no longer triggered on a pressure-difference-based principle. The non-return valves 138B, 140B have therefore been omitted.

Figure 2C:
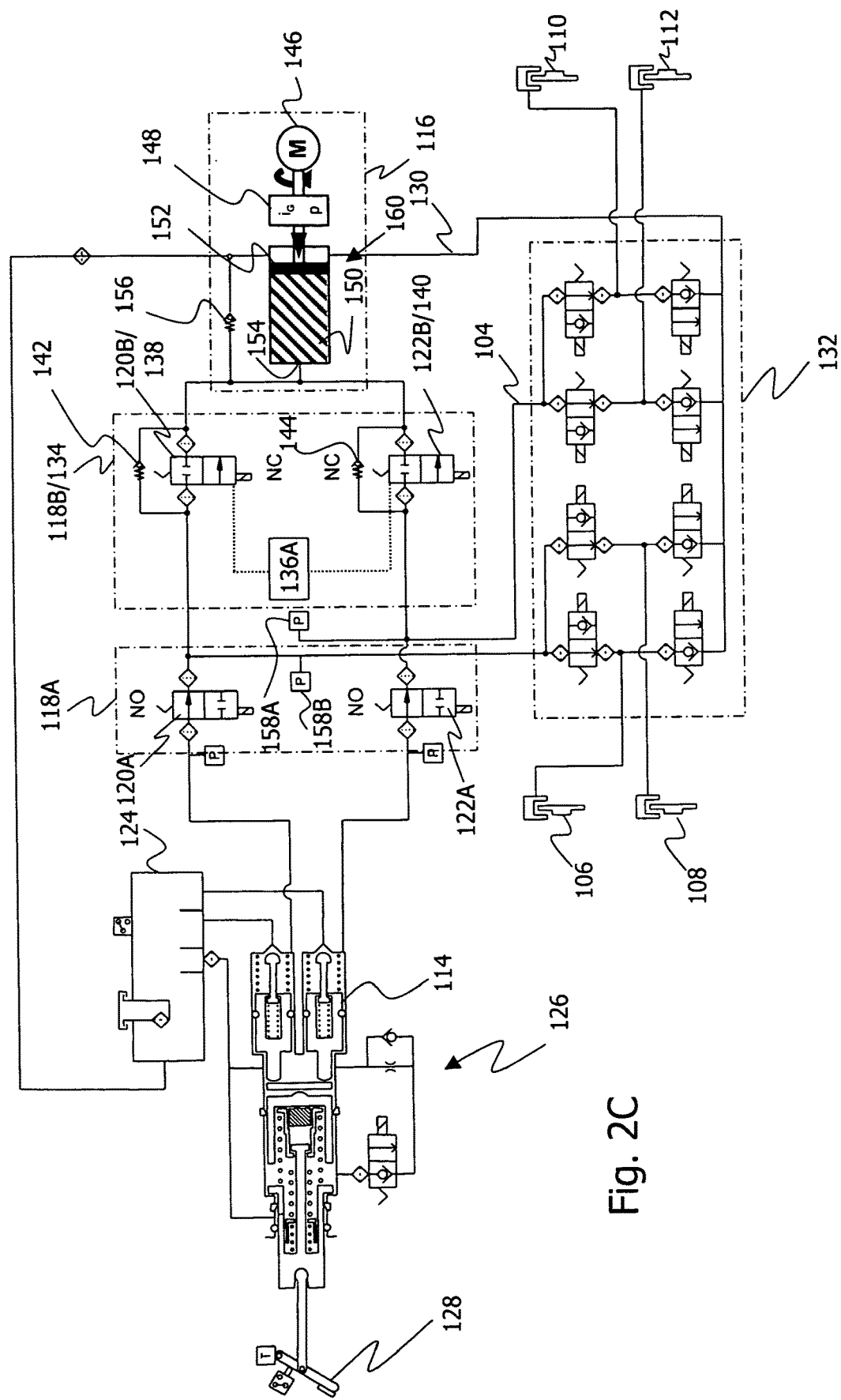

FIG. 2C shows a fourth embodiment of a vehicle brake system 100. The vehicle brake system 100 according to FIG. 2C largely corresponds to the vehicle brake system of the second embodiment. The essential difference relates to the fact that the two shut-off valves 138A, 140A with the associated non-return valves 138B, 140B have been omitted. In functional terms the valves 120B, 122B therefore take over the task of the valves 138, 140 (with associated non-return valves 142, 144) of FIG. 1. Compared to the embodiment according to FIG. 2B, therefore, the possibility of being able to adjust a pressure difference between the brake circuits 102, 104 also in the course of a pressure build-up phase has been eliminated.

In the embodiment according to FIG. 1, for safety reasons the 3/2-way valves 120, 122 of the changeover device 118 have to be so designed that in their electrically non-actuated position determined exclusively mechanically (by spring force) a connection of the master cylinder 114 to the brake circuits 102, 104 exists and a connection to the pressure generator 116 and the two 2/2-way valves 138, 140 is blocked. The 2/2-way valves 138, 140 may therefore be designed both as valves closed (NC) in the non-actuated state and as valves open (NO) in the non-actuated state. In the embodiment according to FIG. 2A, for safety reasons the two 2/2-way valves 120A, 122A, by which a connection to the master cylinder 114 is established, have to be designed as valves open (NO) in the non-actuated state. Furthermore, at least one of the two serially connected 2/2-way valves 138, 120B, 140, 122B has to be designed as a valve closed (NC) in the non-actuated state in order for the connection to the pressure generator 116 to be blocked. The same applies to the embodiment according to 2B, and accordingly in the embodiment according to FIG. 2C the two 2/2-way valves 120A, 122A have to be designed as valves open (NO) in the non-actuated state and the other two 2/2-way valves 120B/138, 122B/140 have to be designed as valves closed (NC) in the non-actuated state.

As already mentioned, the adjustment of the desired hydraulic pressures and/or hydraulic pressure characteristics is effected by means of a purposeful time sequence of pressure build-up, pressure-maintaining and pressure reduction phases, which are realized by means of purposeful triggering of the pressure generator 116 and the respective valves 120B, 122B, 138, 140, 142, 144 of the pressure adjuster 134. In principle the hydraulic pressure adjustment for each individual brake circuit is feasible by means of "simple" valves that have only two defined switching positions. This presupposes that a relatively precisely adjustable central pressure generator 116 is used. In order, because of the outlay and the cost involved, to then find a compromise, precise controllable—and hence technically more complex—valves may be used, which are controllable for example proportionally and/or by means of a pressure difference (cf. FIG. 2A). As a counter to this, mechanical components of the pressure generator 116, such as for example the motor 146 and/or the gear 148, may be of a simpler—and hence more economical—design.

There now follows a description with reference to FIGS. 3 to 6 of various modular concepts for the hydraulic assembly. The hydraulic assembly is provided for a vehicle brake system according to the first embodiment represented in FIG. 1, wherein to underpin the modularity the unit of master cylinder 114 and pedal reaction simulation unit 126 presented in the second embodiment according to FIG. 2A is used. For the sake of clarity, in FIGS. 3 to 6 not all of the reference characters have been taken over and the control electronics 136 have been omitted.

In the following embodiments the individual components of the vehicle brake system are apportioned differently to various subassemblies. With regard to each of the subassemblies various types may exist, which differ from one another with regard to the design of the individual components. In accordance with the modular principle in a first step the required type of each subassembly may then be selected. In a next step the selected types are assembled to form the hydraulic assembly. The hydraulic assembly is then mounted as a whole in the vehicle.

Figure 3:
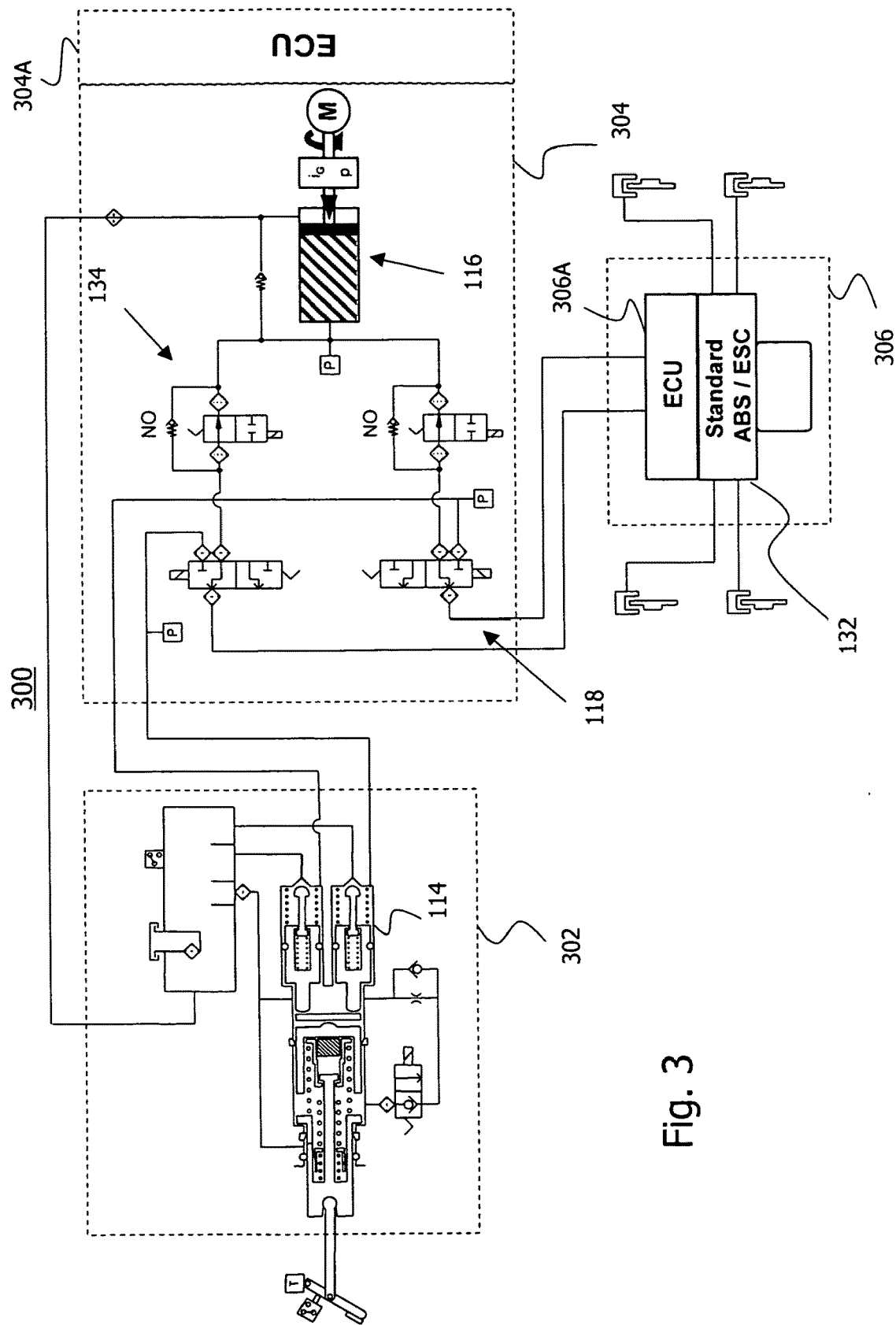
FIG. 3 is a first embodiment of a modular structure of the vehicle brake system according to FIG. 1.

A first embodiment of the modular structure of a hydraulic assembly 300 is represented in FIG. 3. The hydraulic assembly 300 comprises three subassemblies 302, 304, 306. A first subassembly 302 comprises the master cylinder 114 with associated pedal reaction simulation unit. A second subassembly 304 comprises the pressure generator 116, the changeover device 118 and the pressure adjuster 134. The second subassembly 304 further comprises a control unit (electronic control unit or ECU), which comprises all of the electronic components needed to trigger the pressure generator 116, the changeover device 118 and the pressure adjuster 134, such as for example the control electronics 136 according to FIG. 1). A third subassembly 306 contains the valve device 132 as well as a standard control unit 306A for triggering the valve device 132.

Figure 4:
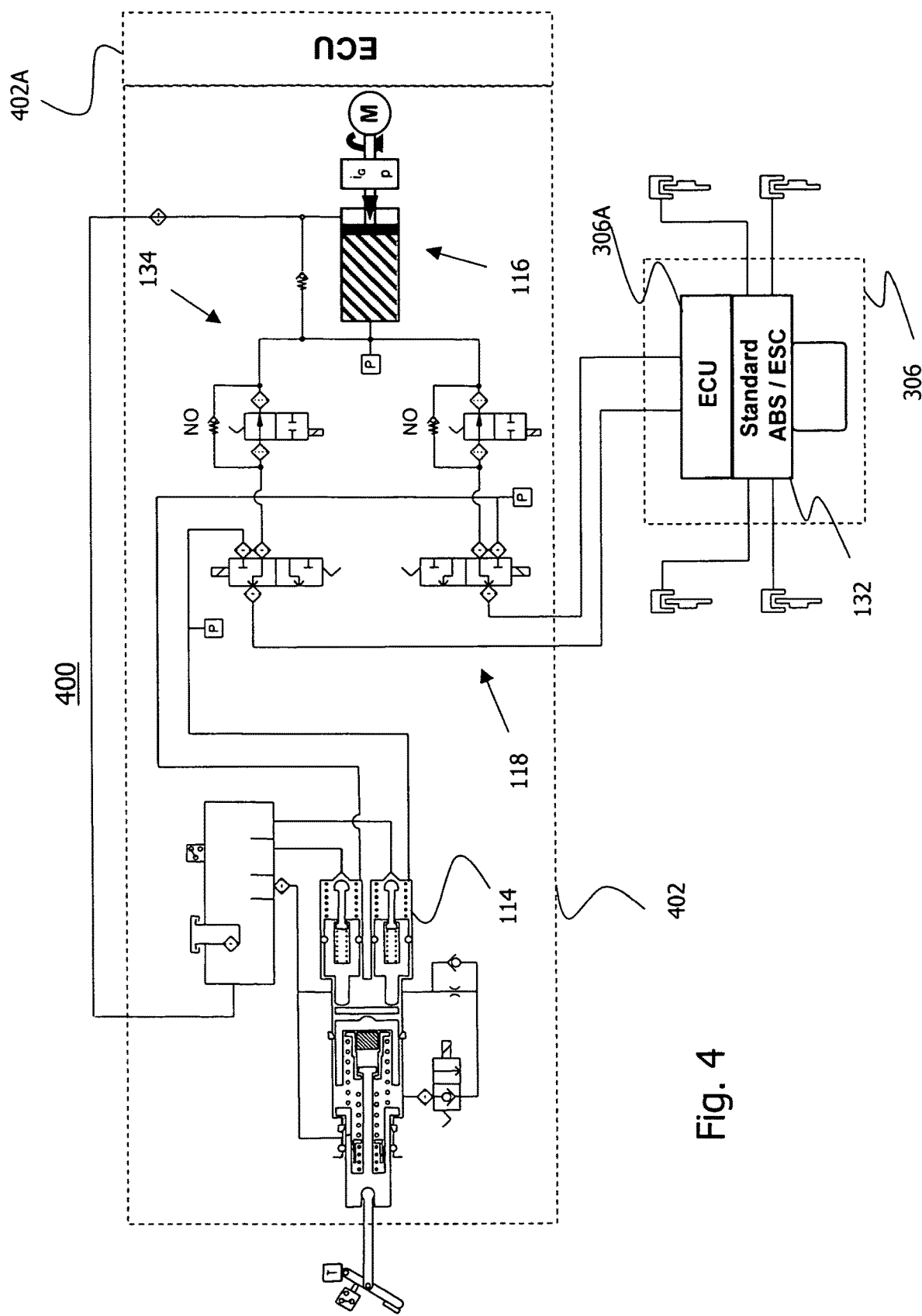
FIG. 4 is a second embodiment of a modular structure of the vehicle brake system according to FIG. 1.

FIG. 4 shows a further embodiment of the modular structure of a hydraulic assembly 400. Compared to the embodiment of FIG. 3 the two subassembly 302, 304 have been combined into a single subassembly 402. A control unit 402A associated with the subassembly 402 functionally corresponds to a large extent to the control unit 304A according to FIG. 3. A second subassembly 306 is identical to the corresponding subassembly of FIG. 3.

Figure 5:
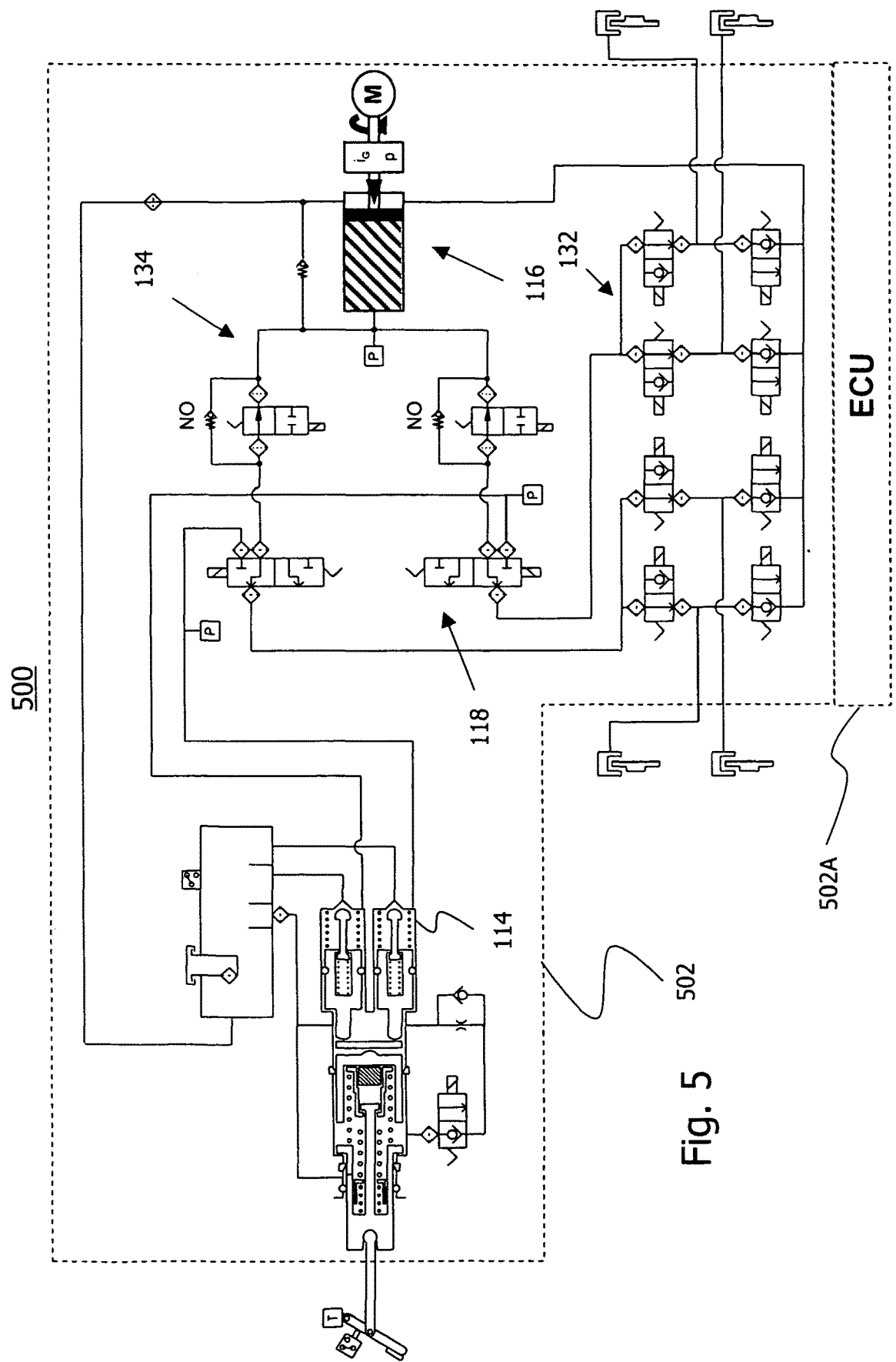
FIG. 5 is a third embodiment of a modular structure of the vehicle brake system according to FIG. 1.

FIG. 5 shows a third embodiment of the modular structure of a hydraulic assembly 500. According to FIG. 5 the hydraulic assembly 500 is realized in the form of a single subassembly 502. The subassembly 502 comprises a control unit 502A, which comprises the necessary electronic components for triggering the pressure generator 116, the changeover device 118, the valve device 132 and the pressure adjuster 134.

Figure 6:
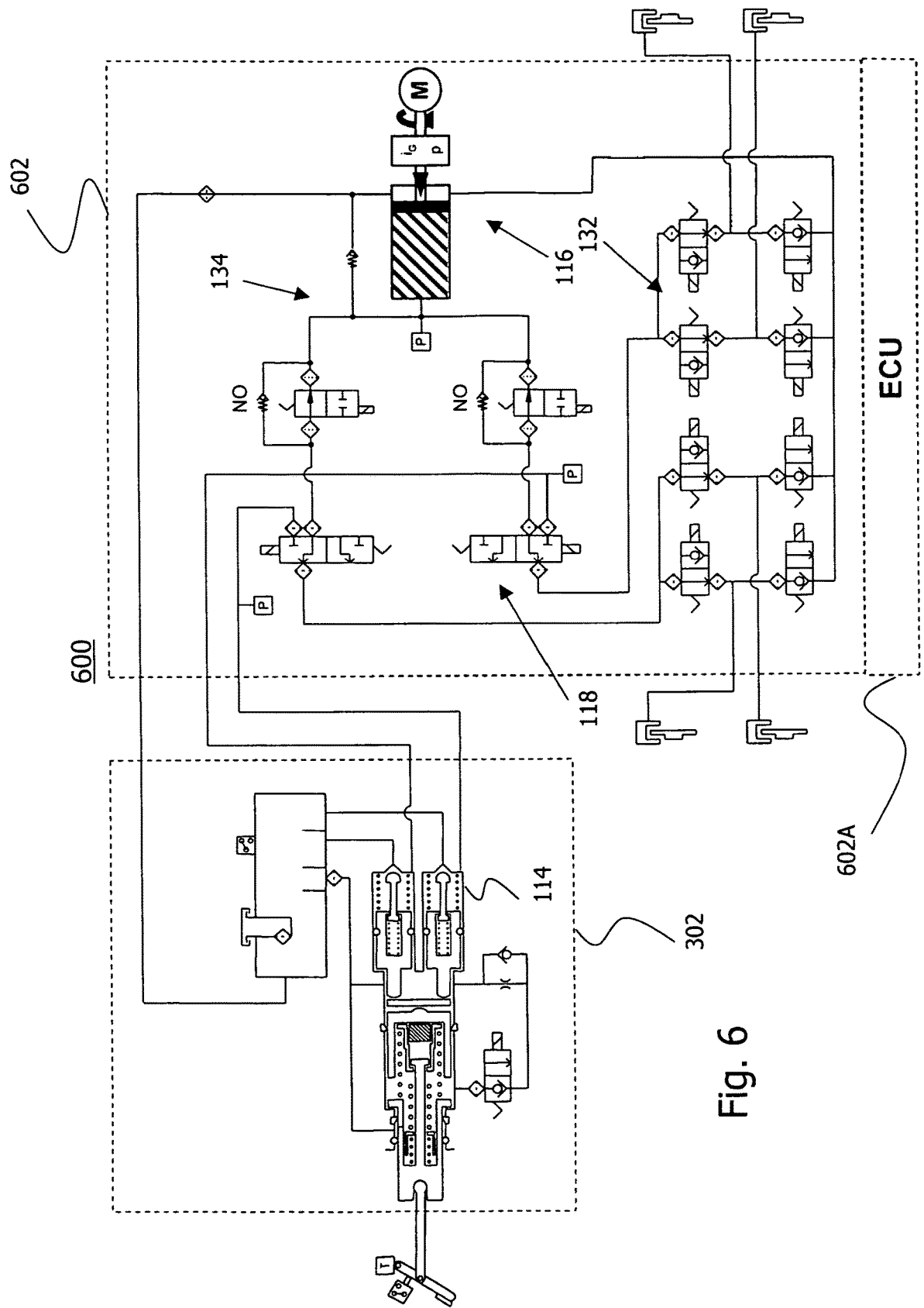
FIG. 6 is a fourth embodiment of a modular structure of the vehicle brake system according to FIG. 1.

FIG. 6 shows a fourth embodiment of the modular structure of a hydraulic assembly 600. The hydraulic assembly 600 according to FIG. 6 comprises a first assembly 302 that is identical to the corresponding assembly of FIG. 3. A second assembly 602 contains the pressure generator 116, the changeover device 118, the valve device 132 and the pressure adjuster 134. The subassembly 602 further comprises a control unit 602A for electrically triggering the individual components of the subassembly 602.

Figure 7:
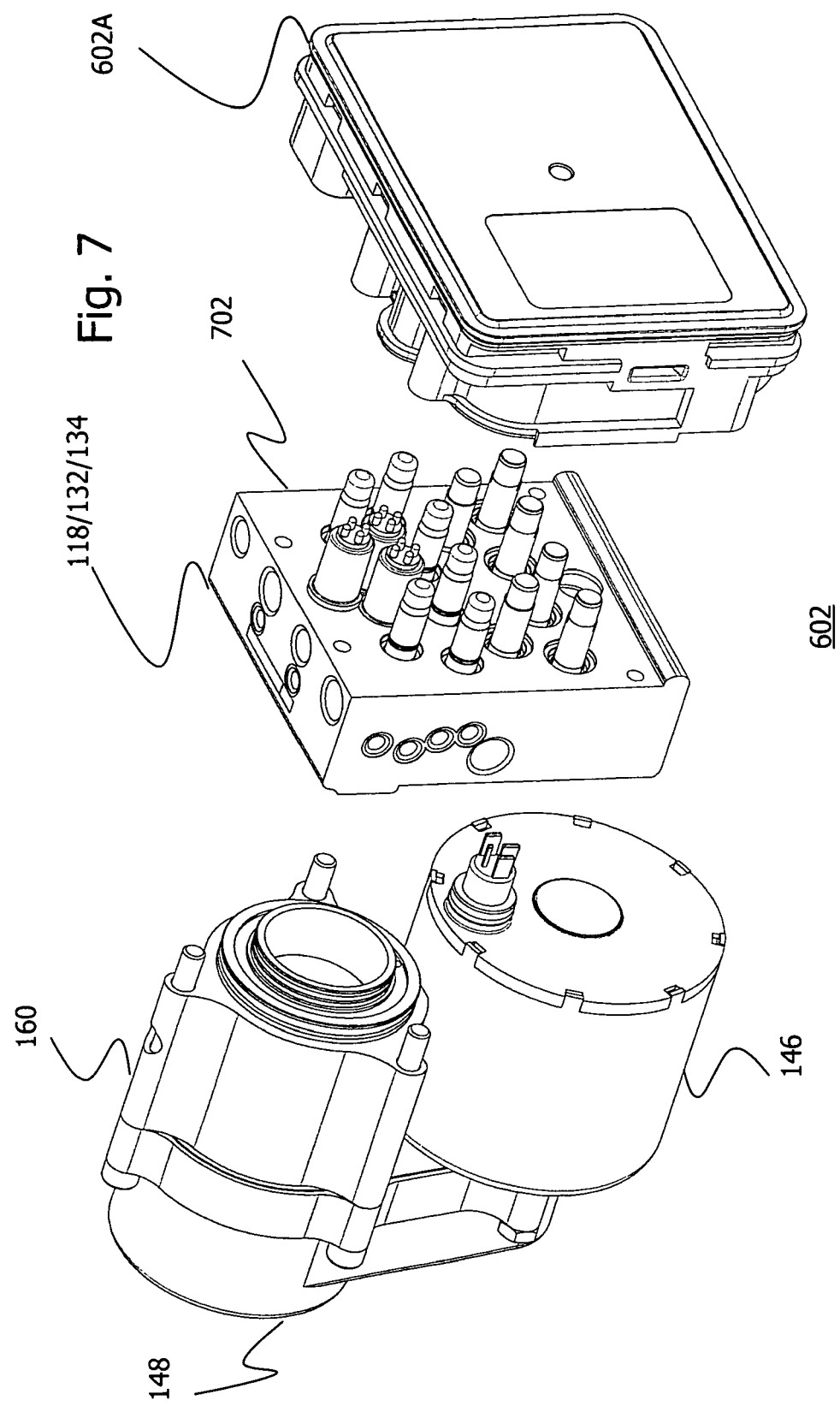
FIG. 7 is an embodiment of a subassembly in an exploded view.
Figure 8:
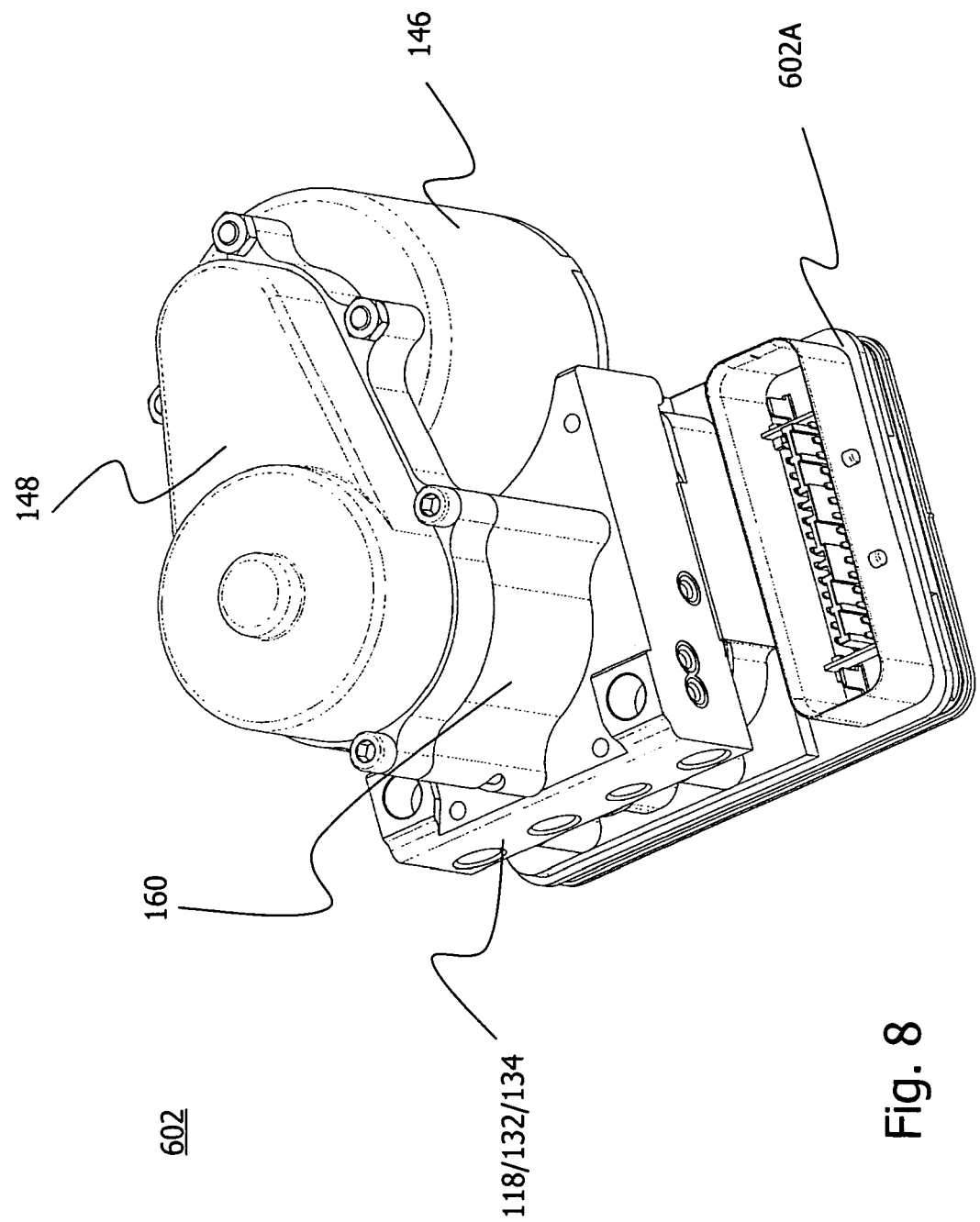
FIG. 8 is a perspective view of the subassembly according to FIG. 7.

FIG. 7 shows an exploded view of the subassembly 602 according to FIG. 6, and FIG. 8 shows the subassembly 602 in the final mounted state. As is evident from these two figures, the electric motor 146 together with the gear 148 and the cylinder/piston system 160 forms a first assembly unit. A second assembly unit is formed by a housing block 702, which receives the valves and pressure sensors of the changeover device 118, the valve device 132 and the pressure adjuster 134. The valves and pressure sensors project in FIG. 7 to the right from the housing block 702 in order to be contacted by the control unit 602A. For this purpose the control unit 602A is placed onto the housing block 702. Inside the housing block 702 the fluid lines illustrated in FIG. 6 are formed.

Figure 9:
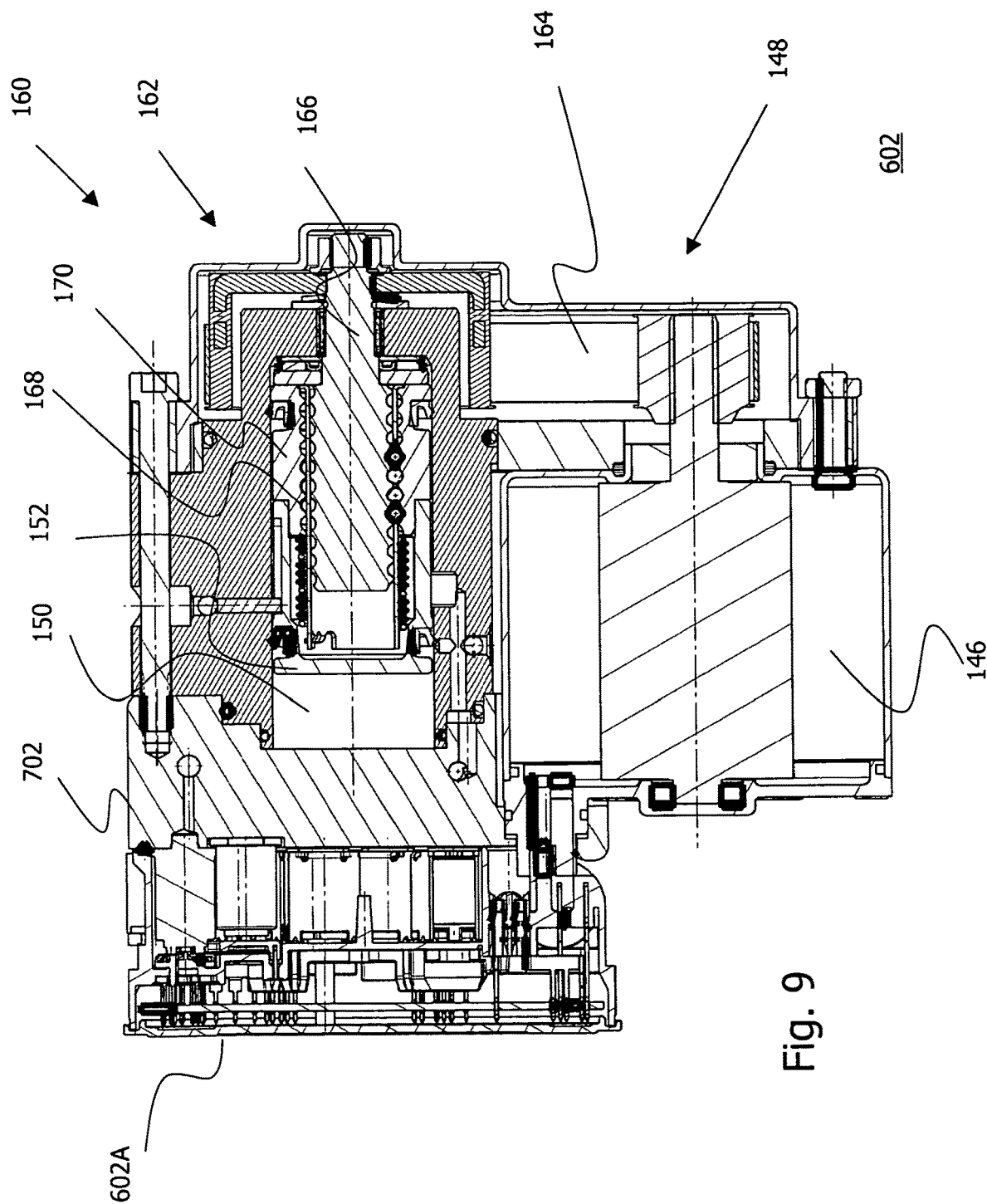
FIG. 9 is a sectional view of the subassembly according to FIGS. 7 and 8.

FIG. 9 is a sectional view of the subassembly 602 according to FIGS. 7 and 8. Clearly visible are the electric motor 146, the gear 148 (in the form of a belt drive) coupled to the output side of the electric motor, and a nut/spindle arrangement 162 actuated by the gear 148. The nut/spindle arrangement 162 comprises a spindle 166 that is driven by a belt 164 of the gear 148. The spindle 166 is coupled by bearing balls 168 to a nut 170 of the nut/spindle arrangement 162. A rotational movement of the spindle 166 brings about a translatory movement of the nut 170 in FIG. 9 either to the left or the right, depending on the direction of rotation.

The nut 170 is coupled rigidly to the piston 152 guided in a fluid-tight manner in the hydraulic chamber 150. A translatory movement of the nut 170 therefore directly brings about a reciprocating movement of the plunger piston 152 in the hydraulic chamber 150. In the event of an intake stroke the plunger piston 152 is moved in FIG. 9 to the right, while in the event of a discharge stroke the plunger piston 152 is moved to the left.

Not visible in the sectional view according to FIG. 9 is the combined inlet-/outlet port 154. This is provided at the end face of the housing block 702 facing the plunger piston 152. Clearly evident from FIG. 9, on the other hand, is the fact that the electric motor 146 is disposed paraxially relative to the plunger piston 152. This arrangement allows the realization of a compact overall size of the subassembly 602.

Figure 10:
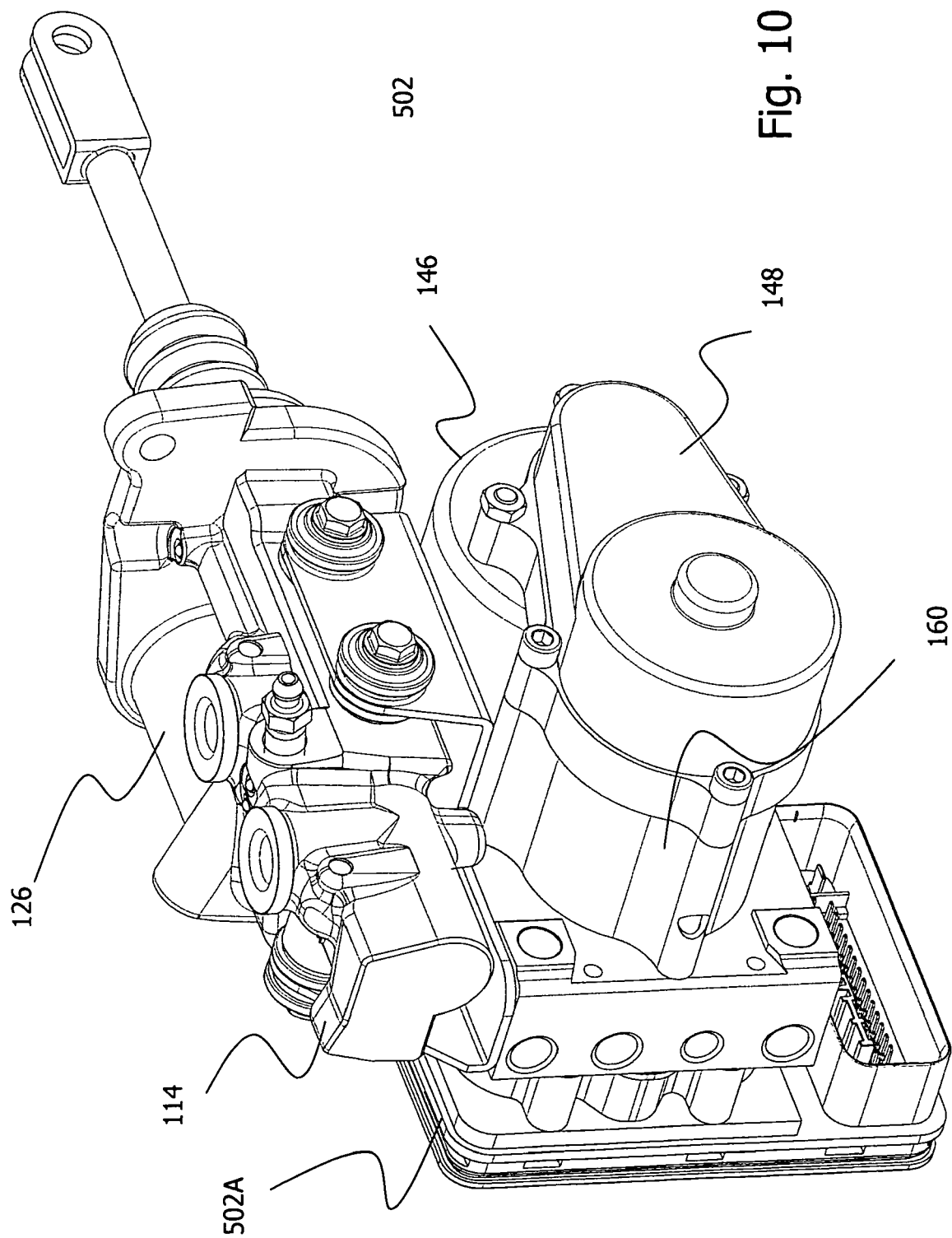
FIG. 10 is a perspective view of a subassembly according to FIGS. 7 and 8 that is supplemented by a master cylinder and a pedal reaction simulation unit.

FIG. 10 shows a perspective view of the subassembly 502 of the modular concept according to FIG. 5. The subassembly 502 comprises, in addition to the assembly units already described in connection with FIGS. 7 and 8, a master cylinder 114 as well as a pedal reaction simulation unit 126 (the unpressurized reservoir is not represented in FIG. 9 as it is not necessarily part of the subassembly).

Figure 11:
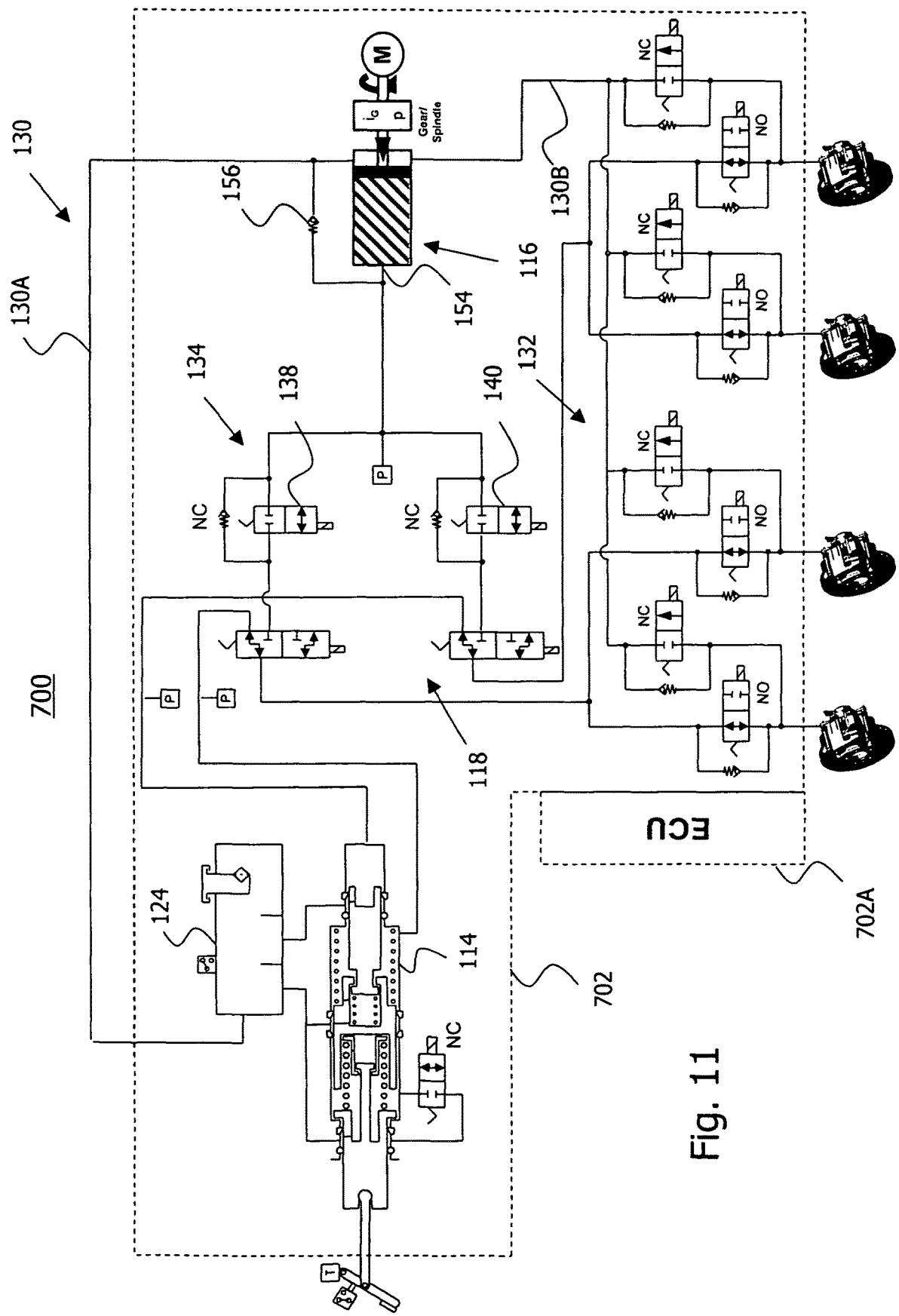
FIG. 11 is a further embodiment of a vehicle brake system.

FIG. 11 shows a further embodiment of a vehicle brake system 700. The vehicle brake system 700 according to FIG. 11 largely corresponds to the vehicle brake system of the first embodiment according to FIG. 1. The vehicle brake system 700 therefore also comprises a driver-actuable master cylinder 114, a pressure generator 116 for generating a hydraulic pressure in the brake circuits independently of the driver (i.e. primarily independently of foot force), a changeover device 118, a valve device 132 for carrying out braking interventions independently of the driver, and a pressure adjuster 134 (with a control device comparable to the control electronics 136 according to FIG. 1) having the functionalities described above.

The fluid line 130 is formed likewise as described in connection with the first embodiment. In this case the fluid line in FIG. 11 is subdivided into a first portion 130A and a second portion 130B. The first portion 130A, starting from the unpressurized hydraulic fluid reservoir 124, branches on the one hand via the non-return valve 156 in the direction of the hydraulic port 154 of the pressure generator 116 and on the other hand via the second part 130B of the fluid line in the direction of the valve device 132 for carrying out braking interventions independently of the driver. The second part 130B serves as a hydraulic fluid return line from the valve device 132 into the reservoir 124, while the first part 130A of the line 130 has both a return functionality as well as an intake functionality.

In a departure from the realization according to the form of construction represented in FIG. 1, the valves 138, 140 of the pressure adjuster 134 are configured as valves closed (normally closed or NC) in the non-actuated state. Furthermore, the structure of the master cylinder 114 (likewise provided with a pedal reaction simulator) as well as the valve configuration thereof have been slightly modified.

In modular terms the vehicle brake system 700 according to FIG. 11 comprises a single hydraulic assembly 702, which is configured as a compact unit. The electronic components needed to trigger the individual components are combined in a single control unit 702A.

Figure 12:
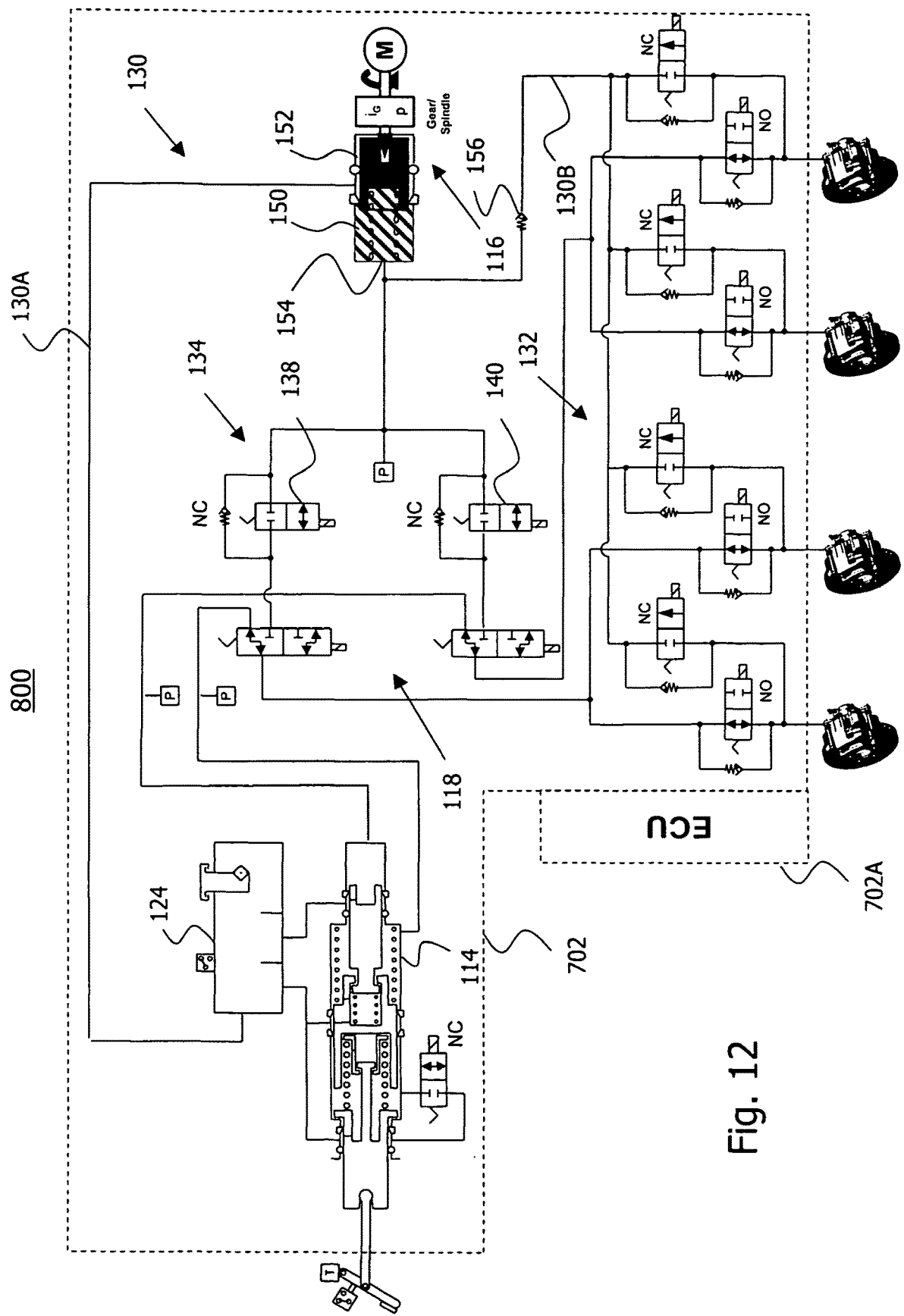
FIGS. 12-14 are additional embodiments of a vehicle brake system on the basis of the embodiment according to FIG. 11 with "closed" fluid return.

FIG. 12 shows a further embodiment of a vehicle brake system 800, which largely corresponds to the vehicle brake system 700 according to FIG. 11. For this reason only the structural features that are different are described in detail below.

The differences between the embodiments according to FIG. 11 on the one hand and FIG. 12 on the other hand mainly relate to the development of the pressure generator 116 and of the hydraulic line 130. As illustrated in FIG. 12, the hydraulic fluid return line 130B associated with the valve device 132 is coupled downstream by the non-return valve 156 to the hydraulic port 154 of the pressure generator 116. In this way, in the event of a hydraulic fluid discharge (dump) from the wheel brakes that is controlled by means of the valve device 132, the returning hydraulic fluid (given a corresponding valve position of the changeover device 118 and the pressure adjuster 134) may be fed into the hydraulic chamber 150 of the pressure generator 116 without hydraulic fluid during a feed process being able to pass through the return line 130B to the wheel brakes.

The pressure generator 116 therefore has a fluid-receiving functionality for hydraulic fluid flowing back through the return line 130B. For this purpose the piston 152 may be moved in FIG. 12 to the right in order to accommodate the volume of the hydraulic chamber 150 for receiving the hydraulic fluid flowing back through the return line 130B.

As illustrated in FIG. 12, the hydraulic fluid return line 130B is fluidically constantly separate from the unpressurized hydraulic fluid reservoir 124. Hydraulic fluid may however pass via the intake line 130A from the reservoir 124 in the event of a discharge stroke of the piston 152 into the hydraulic chamber 150. The hydraulic chamber 150 may therefore be filled with hydraulic fluid both from the reservoir 124 (namely via the hydraulic line 130A) and from the wheel brakes (namely via the hydraulic line 130B).

Figure 13:
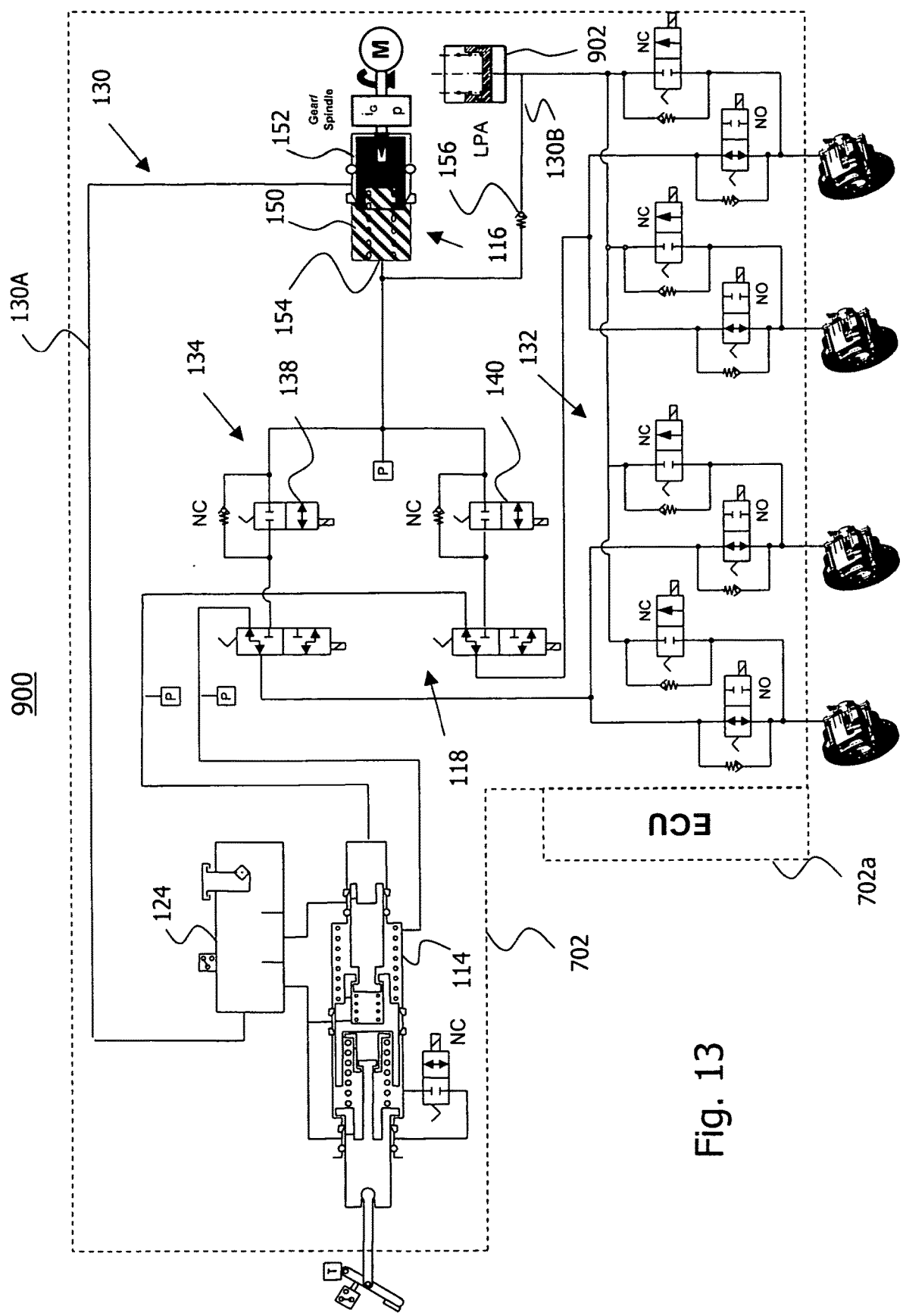

FIG. 13 shows a further embodiment of a vehicle brake system 900, which corresponds substantially to the vehicle brake system 800 according to FIG. 12. The brake system 900 additionally comprises a low pressure accumulator (LPA) 902 in the return line 130B. The pressure accumulator 902 is inserted into the return line 130B between the valve device 132 and the non-return valve 156. The task of the pressure accumulator 902 is to store the hydraulic fluid flowing off from the wheel brakes temporarily until it may pass during an intake stroke of the piston 152 into the hydraulic chamber 150 of the pressure generator 116.

Figure 14:
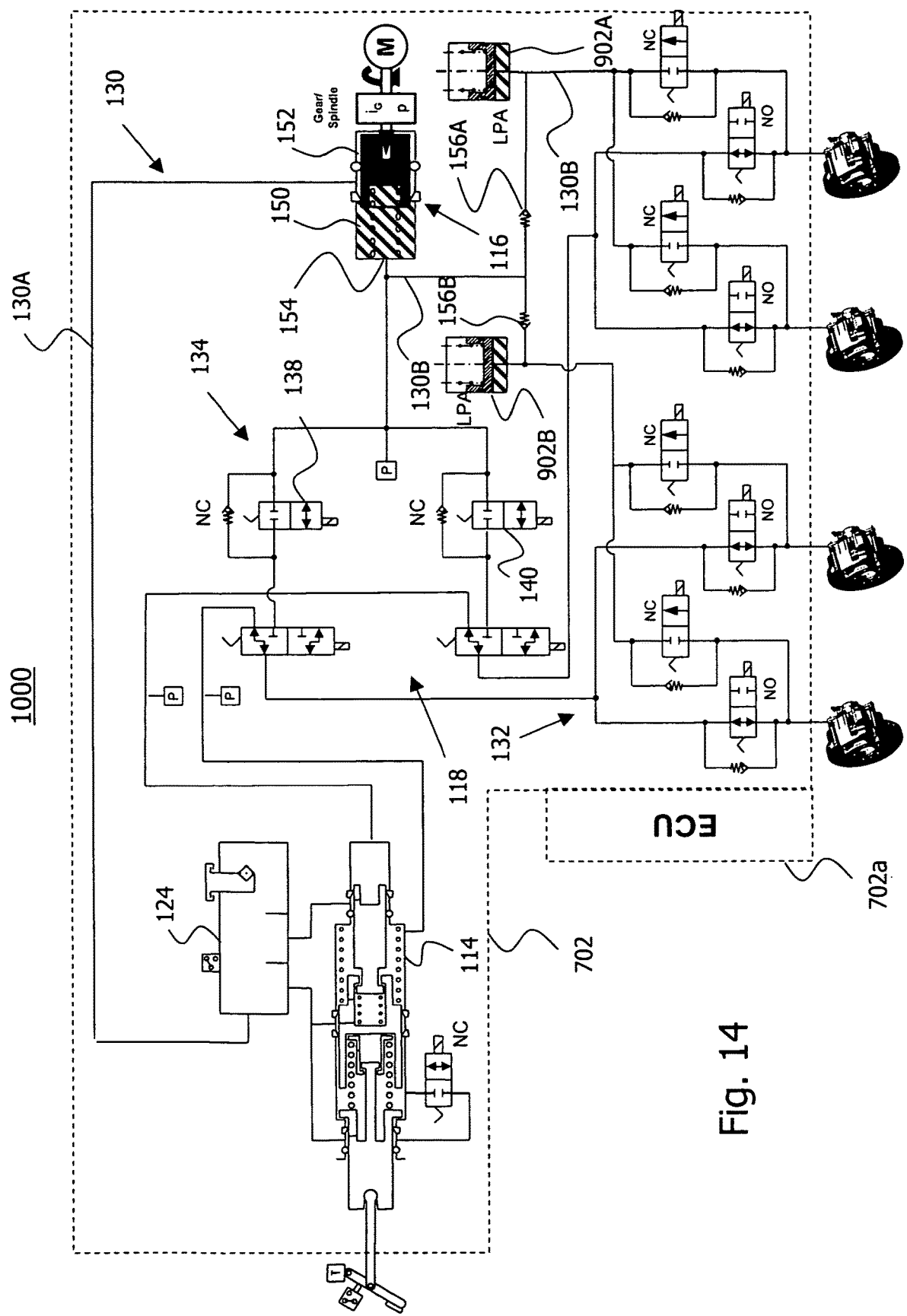

In the embodiment of a vehicle brake system 1000 shown in FIG. 14 two low pressure accumulators 902A, 902B are provided in the return line 130B between the valve device 132 and the pressure generator 116. More precisely, there is a separate pressure accumulator 902A, 902B for each brake circuit. Furthermore, a separate non-return valve 156A, 156B per pressure accumulator 902A, 902B is provided in the return line 130B.

In the forms of construction shown in FIGS. 12 to 14 the hydraulic fluid discharged from the wheel brakes is fed, not into the unpressurized hydraulic fluid reservoir 124, but into the hydraulic chamber 150 of the pressure generator 116. The corresponding feed process may be effected directly (FIG. 12) or indirectly via one or more low pressure accumulators (FIGS. 13 and 14). This development has the advantage that the hydraulic fluid fed by the pressure generator 116 does not have to be taken in (at any rate no longer has to be completely and always taken in) first from the reservoir 124, thereby shortening the pressure build-up phases.

Figure 15:
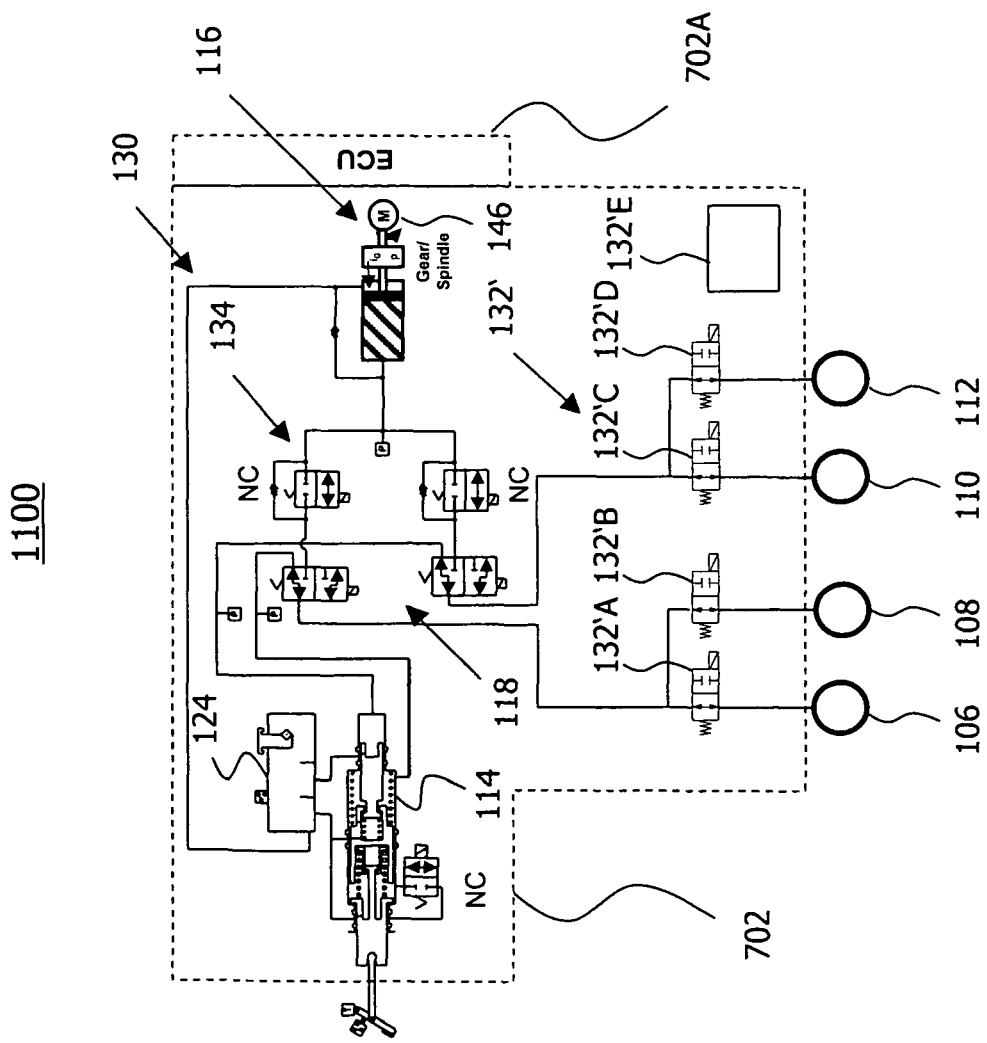
FIG. 15 is a further embodiment of a vehicle brake system for the multiplex mode.

A further embodiment of a vehicle brake system 1100 is shown in FIG. 15. The vehicle brake system 1100 corresponds partially to the vehicle brake system 100 according to FIG. 1 and/or 700 according to FIG. 11. In a departure from those vehicle brake systems 100, 700, the valve device 132 for carrying out braking interventions at the wheel brakes independently of the driver is replaced by a valve device 132' for adjusting the braking pressure for each individual wheel or wheel group in multiplex mode. The valve device 132' may be used for brake pressure adjustment both in the course of a service braking operation and in the course of a system braking operation.

The valve device 132' is disposed between the pressure adjuster 134 and the wheel brakes 106, 108, 110, 112 and comprises precisely one valve 132'A, 132'B, 132'C, 132'D per wheel brake 106, 108, 110, 112. Control electronics 132'E are further provided, which allow a triggering of the valves 132'A, 132'B, 132'C, 132'D in multiplex mode. For adjusting the pressure for each individual wheel or wheel group the electric motor 146 is configured as a high-dynamic actuator.

The multiplex mode is generally described in WO 2006/111393 A1 and in WO 2010/091883. For this reason only one exemplified example of this operating mode is described below, with it being assumed that at the rear wheel brakes 106, 108 as a group a brake pressure of 30 bar and at the front wheel brakes 110, 112 as a group a brake pressure of 50 bar is to be adjusted. In this case, in the run-up to the pressure build-up the valves of the changeover device 118 and the pressure adjuster 134 are switched in such a way that by means of the pressure generator 116 a brake pressure may be built up at the wheel brakes 106, 108, 110, 112.

At the start of the pressure build-up phase all of the valves of the valve device 132' are open. Upon attainment of the first target pressure of 30 bar, first the valves 132'A, 132'B associated with the wheel brakes 106, 108 of the rear wheels close, wherein the pressure continues to rise. As soon as the pressure rise has reached a value of 50 bar (second target pressure), the valves 132'C, 132'D associated with the wheel brakes 110, 112 of the front wheels are also closed. The hydraulic pressure prevailing at the instant of closing of the respective valve 132'A, 132'B, 132'C, 132'D at the respective wheel brake 106, 108, 110, 112 is maintained ("locked in") until the valve is opened again. After said opening, a further pressure build-up or a pressure reduction may be effected.

In addition to the brake pressure adjustment for each individual wheel or wheel group by means of the valve device 132' in multiplex mode, the possibility of a pressure adjustment for each individual brake circuit by means of the pressure adjuster 134 is maintained. Use may be made of this possibility for example in a regenerative braking mode. For example there may be a desire to uncouple the wheel brakes of one vehicle axle (first brake circuit) completely from the pressure generator 116 for the generator mode, while at the wheel brakes of another vehicle axle (second brake circuit) brake pressure is to be built up by means of the pressure generator 116. For this purpose, the valve of the pressure adjuster 134 that is associated with the first brake circuit may be closed and the valve associated with the second brake circuit may be opened.

As emerges from the exemplified description of the embodiments, a number of significant advantages result from the combination of a central hydraulic pressure generation with subsequent hydraulic pressure adjustment for each individual brake circuit. Further advantages arise from the different versions of the optional modular principle, according to which the hydraulic assembly is divided into different subassemblies. The previously described divisions of the hydraulic assembly into individual subassemblies are of course merely by way of example. In other words, different divisions may also be carried out.

Further advantages emerge from the selective coupling of a fluid input of the pressure generator to fluid outlets associated with the wheel brakes. Furthermore, the embodiments presented here may be combined with a brake pressure adjustment for each individual wheel in multiplex mode.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A hydraulic assembly for a vehicle brake system comprising at least two brake circuits and wheel brakes associated with the brake circuits, the hydraulic assembly being realized in the form of a single subassembly, comprising:
a master cylinder for generating a hydraulic pressure by a driver;
a pressure generator comprising an electric motor, a gear and a cylinder/piston system with a hydraulic chamber and a plunger piston, a position of the plunger piston being adjustable by means of the electric motor; and
a housing block which receives valves and pressure sensors;

wherein the electric motor is disposed axially orthogonal relative to the master cylinder;

a pedal reaction simulation unit;

wherein the plunger piston is disposed axially orthogonal relative to the master cylinder;

the hydraulic chamber of the pressure generator being configured to receive hydraulic fluid and the plunger piston being movable within the hydraulic chamber for generating a hydraulic pressure independently of the driver, wherein the at least two brake circuits can be supplied with hydraulic fluid from the hydraulic chamber;

a changeover device for selectively coupling the wheel brakes to either the hydraulic pressure generated by the driver or a hydraulic pressure generated independently of the driver;

wherein the changeover device is electrically actuable and in a non-actuated state couples the wheel brakes to a driver-actuable master cylinder and in an actuated state couples the wheel brakes to the pressure generator;

the changeover device being provided functionally between the wheel brakes on the one hand and the master cylinder and the pressure generator on the other hand;

wherein the housing block receives at least one of valves and pressure sensors of the changeover device;

wherein the at least one of valves and pressure sensors project on a side of the housing block opposite to the electric motor;

wherein the at least one of valves and pressure sensors projecting on the side of the housing block are covered and electrically contacted by a control unit;

the control unit being disposed on a side of the housing block opposite to the electric motor; and a valve device provided between the changeover device and the wheel brakes, the valve device being configured for braking interventions at the wheel brakes independently of the driver.

2. The hydraulic assembly according to claim 1, wherein the pedal reaction simulation unit is disposed paraxially relative to the master cylinder.

* * * * *